United States Patent
Guo et al.

(10) Patent No.: US 10,231,144 B2
(45) Date of Patent: Mar. 12, 2019

(54) CONFIGURATION METHOD FOR CHANNEL STATE INFORMATION FEEDBACK SIGNAL AND BASE STATION AND TERMINATION

(71) Applicant: ZTE CORPORATION, Shenzhen, Guangdong Province (CN)

(72) Inventors: Senbao Guo, Shenzhen (CN); Yu Ngok Li, Shenzhen (CN); Yunfeng Sun, Shenzhen (CN); Junfeng Zhang, Shenzhen (CN)

(73) Assignee: XI'AN ZHINGXING NEW SOFTWARE CO., LTD., Xi'An, Shaanxi (CN)

( * ) Notice: Subject to any disclaimer, the term of this patent is extended or adjusted under 35 U.S.C. 154(b) by 409 days.

(21) Appl. No.: 14/394,750

(22) PCT Filed: Aug. 22, 2013

(86) PCT No.: PCT/CN2013/082044
§ 371 (c)(1),
(2) Date: Oct. 16, 2014

(87) PCT Pub. No.: WO2014/048189
PCT Pub. Date: Apr. 3, 2014

(65) Prior Publication Data
US 2015/0098346 A1    Apr. 9, 2015

(30) Foreign Application Priority Data
Sep. 28, 2012 (CN) .......................... 2012 1 0370539

(51) Int. Cl.
*H04W 24/10* (2009.01)
*H04W 72/04* (2009.01)
(Continued)

(52) U.S. Cl.
CPC .......... *H04W 24/10* (2013.01); *H04B 7/0478* (2013.01); *H04B 7/0626* (2013.01);
(Continued)

(58) Field of Classification Search
CPC .... H04L 5/0057; H04B 7/0632; H04B 7/0626
See application file for complete search history.

(56) References Cited

U.S. PATENT DOCUMENTS

2011/0305161 A1* 12/2011 Ekpenyong ........... H04L 1/0031
370/252
2012/0121031 A1    5/2012 Tang et al.
(Continued)

FOREIGN PATENT DOCUMENTS

CN    101365232 A    2/2009
CN    102065560 A    5/2011
(Continued)

OTHER PUBLICATIONS

Author Unknown, Email discussion [69-11]: FFS aspects of aperiodic CSI feedback for CoMP, 3GPP TSG RAN WG1 Meeting #69, Doc. No. R1-122931, May 25, 2012, pp. 1-22.*
(Continued)

*Primary Examiner* — Christopher M Crutchfield
(74) *Attorney, Agent, or Firm* — Ling Wu; Stephen Yang; Ling and Yang Intellectual Property

(57) ABSTRACT

Methods for configuring Channel State Information (CSI) feedback signalings, feeding back CSI, configuring data demodulation, data demodulating, configuring antenna port information, obtaining antenna port information, base stations and terminals are disclosed. The method for configuring CSI feedback signalings includes: the base station configuring N CSI measurement processes for measuring and feeding back CSI for the terminal, each of them being independently configured with one or more of the following through terminal dedicated higher layer signaling: codebook subset restriction, PMI-RI-Report, PMI feedback-enabled, RI feedback-enabled, RI feedback-enabled according to reference process, PMI feedback-enabled according to reference process, sub-band feedback-enabled according to reference process, feedback mode, resource location fed back by PUCCH corresponding to CSI measurement process, subframe offset and cycle fed back by PUCCH corresponding to CSI measurement process, and initialization
(Continued)

sequence ID of PUCCH corresponding to CSI measurement process; the base station sending the N CSI measurement processes to the terminal.

14 Claims, 4 Drawing Sheets

(51) Int. Cl.
    *H04L 5/00*           (2006.01)
    *H04B 7/0456*       (2017.01)
    *H04B 7/06*          (2006.01)
    *H04L 1/00*          (2006.01)

(52) U.S. Cl.
    CPC ......... *H04B 7/0645* (2013.01); *H04L 1/0026* (2013.01); *H04L 5/0023* (2013.01); *H04L 5/0057* (2013.01); *H04W 72/042* (2013.01); *H04W 72/0413* (2013.01); *H04B 7/063* (2013.01); *H04B 7/0639* (2013.01); *H04L 5/0035* (2013.01); *H04L 5/0048* (2013.01); *H04L 5/0073* (2013.01)

(56) References Cited

U.S. PATENT DOCUMENTS

| | | | |
|---|---|---|---|
| 2012/0287799 A1* | 11/2012 | Chen | H04B 7/024 370/252 |
| 2013/0195045 A1* | 8/2013 | Papasakellariou | H04W 72/042 370/329 |
| 2013/0223258 A1* | 8/2013 | Seo | H04W 24/02 370/252 |
| 2014/0185543 A1* | 7/2014 | Kang | H04B 7/0626 370/329 |

FOREIGN PATENT DOCUMENTS

| | | |
|---|---|---|
| CN | 102291224 A | 12/2011 |
| CN | 102468926 A | 5/2012 |
| CN | 102684850 A | 9/2012 |
| WO | 2012015154 A1 | 2/2012 |
| WO | 2012097526 A1 | 7/2012 |
| WO | 2012175272 A1 | 12/2012 |

OTHER PUBLICATIONS

Author Unknown, CSI Report Higher Layer Parameters for CoMP, 3GPP TSG RAN WG1 Meeting #70, Doc. No. R1-123283, Aug. 17, 2012, pp. 1-3.*
Author Unknown, Email discussion [69-10]: Details of collision handling and compression/multiplexing in case of 2 or more CSIs being configured in the same reporting instance for CoMP CSI feedback, 3GPP TSG RAN WG1 Meeting #69, Doc. No. R1-122930, May 25, 2012, pp. 1-30.*
Technical Specification Group Radio Access Network; Evolved Universal Terrestrial Radio Access (E-UTRA); 3rd Generation Partnership Project; 3GPP TS 36.213; V11.0.0(Sep. 2012) Physical layer procedures.
Remaining aspects of Quasi-co-located Antenna Ports; Alcatel-Lucent, Alcatel-Lucent Shanghai Bell; 3GPP TSG-RAN1 Meeting #70, QingDao, China, Aug. 13-17, 2012. R1-123155.
Remaining Issues on quasi co-location of antenna ports; Samsung; 3GPP TSG-RAN1 Meeting #70, QingDao, China, Aug. 13-17, 2012. R1-123855.
Samsung, CSI Feedback Configuration for CoMP, 3GPP TSG RAN WG1 #70, Qingdao, China, Aug. 13-17, 2012. R1-123467.
Fujitsu, Email discussion [69-10]: Details of collision handling and compression/multiplexing in case of 2 or more CSIs being configured in the same reporting instance for CoMP CSI feedback, 3GPP TSG RAN WG1 Meeting #70, Qingdao, China, Aug. 13-17, 2012. R1-123295.
Fujitsu, Email discussion [69-11]: FFS aspects of aperiodic CSI feedback for CoMP, 3GPP TSG RAN WG1 Meeting #70, Qingdao, China, Aug. 13-17, 2012. R1-123296.

* cited by examiner

CONFIGURATION METHOD FOR CHANNEL STATE INFORMATION FEEDBACK SIGNAL AND BASE STATION AND TERMINATION

TECHNICAL FIELD

The present document relates to the field of communication, and particularly, to a method for configuring channel state information feedback signalings, a method for feeding back channel state information, a method for configuring data demodulation, a method for data demodulation, a method for configuring antenna port information, a method for obtaining antenna port information, base stations and terminals.

BACKGROUND OF THE RELATED ART

For the Long Term Evolution (LTE) system, after undergoing a plurality of releases such as Releases (R) 8/9/10, the R11 technology is to be developed successively. Currently, part of R8 products start to be gradually commercial, and R9 and R 10 products have yet to be programmed.

After undergoing the R8 stage and R9 stage, many new characteristics are added in the R10 based on the previous two stages, for example, pilot frequency characteristics such as Demodulation Reference Signal (DMRS) and Channel State Information Reference Signal (CSI-RS), transmission and feedback characteristics such as 8-antennae supporting and so on, and especially the inter-cell interference avoidance technology is considered in the enhanced Inter-Cell Interference Cancelling (eICIC) technology based on the consideration of R8/9 ICIC. With regard to the technology for solving the inter-cell interference problem, cell interference avoidance in a homogeneous network is mainly considered in the initial phase of R10 stage, wherein the eICIC technology and Coordinated Multi-point (CoMP) technology are mainly considered. As the name suggests, the CoMP means that a plurality of points coordinate to transmit data to one or more User Equipments (UE) with the same time-frequency resources or different time-frequency resources. Thus, inter-cell interference can be reduced, cell edge throughput can be improved, and cell coverage can be expanded. However, since introduction of more scenarios in a heterogeneous network, complexity of the CoMP technology and time limitation of the R10 discussion are considered in the later period of discussion, it is eventually decided that additional CoMP standardization contents are not introduced in the R10 stage, but it can be designed according to demands of the CoMP part when the CSI-RS is designed, thus the CoMP technology is not further discussed after the 60bis conference.

Configuration information of the R10 CSI-RS mainly includes Non Zero Power (NZP) CSI-RS configuration signaling and zero power CSI-RS configuration signaling. The non zero power CSI-RS configuration mainly considers to notify a terminal side of the time-frequency resource location of each non zero power CSI-RS within one subframe by means of using table indexes, as shown in Table 1 and Table 2; and to notify the terminal side of the number of time-frequency resources occupied by the non zero power CSI-RS and corresponding antenna ports and notify the terminal side of subframes receiving the CSI-RS through subframe offset and cycle indexes, as shown in Table 3.

TABLE 1

Resource mappings configured by the CSI-RS in subframes with normal cyclic prefix

| | CSI-RS configurations | The number of configured CSI-RS antenna ports | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure types 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Only frame structure type 2 | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

Resource mappings configured by the CSI-RS in subframes with extended cyclic prefix

| | | The number of configured CSI-RS antenna ports | | | | | |
|---|---|---|---|---|---|---|---|
| | CSI-RS | 1 or 2 | | 4 | | 8 | |
| | configurations | (k', l') | $n_s$ mod 2 | (k', l') | $n_s$ mod 2 | (k', l') | $n_s$ mod 2 |
| Frame structure types 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Only frame structure type 2 | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

TABLE 3

CSI-RS subframe configuration

| CSI-RS-subframe configuration $I_{CSI-RS}$ | CSI-RS cycle $T_{CSI-RS}$ (subframe) | CSI-RS subframe offset $\Delta_{CSI-RS}$ (subframe) |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

The zero power CSI-RS notifies the terminal side of resource elements on which rate matching is required to be performed by using a 16-bit bitmap sequence. The terminal side is notified of the subframe in which the zero power CSI-RS is located through the subframe offset and cycle, as shown in Table 3.

An object of the non zero power CSI-RS is mainly to make the terminal side measure CSI and feed it back to a base station side. A main object of the zero power CSI-RS is to reduce interference of data services with the CSI-RS so as to improve the accuracy of CSI measurement, the terminal side is informed of the resource location of the CSI-RS at the base station side, and the terminal side assumes that the base station does not place a Physical Downlink Shared Channel (PDSCH) or other reference signals or channels in the resource location of the zero power CSI-RS.

The R11 is required to consider the influence of CoMP on the standard, it is particularly required to consider configurations of interference measurement resource and resource configurations of the zero power CSI-RS. In the latest 68bis conference, it is discussed that more accurate interference estimation performance can be obtained by using the resource measurement interference of the zero power CSI-RS, and meanwhile, it also can be partly compatible with an R10 terminal, which makes the R10 terminal avoid a performance loss of the PDSCH punching resulted from the interference measurement resources by configuring the zero power CSI-RS. If the way of zero power CSI-RS measurement interference is introduced in the R11 stage, rate matching resources required to be identified by the terminal side include the following three kinds:

1. Non zero power CSI-RS resource: it mainly refers to that the base station side sends the CSI-RS in the way of 8 or 4 ports, but the terminal side can only maximally support 4 or 2 ports, thus rate matching is required to be performed in other port locations that cannot be identified at this point; or the base station side sends the CSI-RS, but the terminal side adopts feedback modes such as 1-0, 2-0 or 3-0 mode, thus it is not required to configure CSI-RS ports at the moment, and it is only required to configure the zero power CSI-RS.

2. Zero power CSI-RS resource: used for reducing the interference of data services on the CSI-RS measurement.

3. Zero power CSI-RS resource: used for the terminal side measuring interferences in corresponding resource locations.

Configuration objects of the first and second kinds of resources are identical with a configuration object of the R10 zero power CSI-RS; the third kind of resource is a newly added zero power CSI-RS used for interference measurement. Therefore, it is required to have new zero power CSI-RS configuration ways with regard to the R11, two parts are at least included, one part is used for interference measurement; and the other part is used for rate matching. For an easy description, the zero power CSI-RS used for interference measurement is temporarily called the Interference Measurement Resource (IMR), and the zero power CSI-RS used for rate matching is called the Rate Matching Resource (RMR).

Besides being required to measure channel information on the NZP CSI-RS, the R11 terminal is also required to measure interference information on the IMR, and one R11 terminal can configure a plurality of NZP CSI-RSs and IMRs, thus a concept of CSI Process is introduced in the discussion during the R11 conference, one CSI process corresponds to a channel part of one NZP CSI-RS and an interference measurement information part of one IMR. Moreover, in discussions of the eICIC of R10 and the Further eICIC (feICIC) of R11, a concept of Subframe Sets is introduced, with regard to a situation that different subframe sets respectively correspond to different interferences, for example, two subframe sets, i.e., a subframe set 0 and a subframe set 1, are configured, the subframe set 0 corresponds to a Non Almost Blank Subframe (ABS), the subframe set 1 corresponds to an ABS, and two subframe sets constitute all valid downlink subframes.

SUMMARY OF THE INVENTION

The example of the present document provides a method for configuring channel state information feedback signaling, a method for feeding back channel state information, base stations and terminals, to solve the problem that it is required to consider configuration information by combining CSI processes and subframe sets since different CSI processes will encounter different interference conditions in different subframe sets.

Wherein, a codebook restriction cluster set is also can be called a Codebook Subset Restriction in the present patent, which is mainly for limiting the terminal to feed back a number of available layers and a scope of codebook selections.

The example of the present document provides a method for configuring Channel State Information (CSI) feedback signalings, which comprises:

a base station configuring N CSI measurement processes used for measuring and feeding back CSI for a terminal, wherein, each of the N CSI measurement processes is independently configured with one or more of the following signalings through a terminal dedicated higher layer signaling: a codebook subset restriction, Precoding Matrix Indicator-Rank Indicator-Report (PMI-RI-Report), PMI feedback enabled, RI feedback enabled, RI feedback enabled according to reference process, PMI feedback enabled according to reference process, sub-band feedback enabled according to reference process, a feedback mode, a resource location fed back by Physical Uplink Control Channel (PUCCH) corresponding to CSI measurement process, subframe offset and cycle fed back by PUCCH corresponding to CSI measurement process, and an initialization sequence Identifier (ID) of PUCCH corresponding to CSI measurement process; and the base station sending the N CSI measurement processes to the terminal, wherein N is a positive integer.

Alternatively, after the step of a base station configuring N CSI measurement processes for a terminal, the method further comprises:

the base station configuring one or more CSI processes corresponding to an aperiodic triggering state through a terminal dedicated higher layer signaling using a bitmap sequence; and the base station triggering one or more CSI processes corresponding to each aperiodic triggering state through a 2-bit trigger signaling in Downlink Control Information (DCI).

Alternatively, one CSI measurement process only includes one CSI process, or includes a combination of one CSI process and one subframe set.

Alternatively, when one CSI process is configured with subframe set information, the CSI process is divided into two CSI measurement processes, a first CSI measurement process corresponds to a combination of the CSI process and a first subframe set in the subframe set information, and a second CSI measurement process corresponds to a combination of the CSI process and a second subframe set in the subframe set information.

The example of the present document further provides a method for feeding back Channel State Information (CSI), which comprises:

a terminal receiving N CSI measurement processes sent by a base station, wherein, each of the N CSI measurement processes is independently configured with one or more of the following signalings through a terminal dedicated higher layer signaling: a codebook subset restriction, Precoding Matrix Indicator-Rank Indicator-Report (PMI-RI-Report), PMI feedback enabled, RI feedback enabled, RI feedback enabled according to reference process, PMI feedback enabled according to reference process, sub-band feedback enabled according to reference process, a feedback mode, a resource location fed back by Physical Uplink Control Channel (PUCCH) corresponding to CSI measurement process, subframe offset and cycle fed back by PUCCH corresponding to CSI measurement process, and an initialization sequence Identifier (ID) of PUCCH corresponding to CSI measurement process; and the terminal measuring CSI according to the N CSI measurement processes, and feeding back a measurement report to the base station.

Alternatively, one CSI measurement process only includes one CSI process, or includes a combination of one CSI process and one subframe set.

Alternatively, when one CSI process is configured with subframe set information, the CSI process is divided into two CSI measurement processes, a first CSI measurement process corresponds to a combination of the CSI process and a first subframe set in the subframe set information, and a second CSI measurement process corresponds to a combination of the CSI process and a second subframe set in the subframe set information.

Alternatively, the measurement report includes one or more of the following contents: PMI, Channel Quality Information (CQI) and RI.

Alternatively, the method further comprises: when a collision occurs among a plurality of measurement reports fed back by the terminal, the terminal dropping measurement reports in turn according to a priority order of report type, CSI measurement process index and carrier index.

Alternatively, after the step of a terminal receiving N CSI measurement processes sent by a base station, the method further comprises:

the terminal obtaining one or more CSI processes corresponding to one aperiodic triggering state by receiving a terminal dedicated higher layer signaling using a bitmap sequence; and the terminal obtaining a signaling for triggering one or more CSI processes corresponding to each aperiodic triggering state by detecting a 2-bit trigger signaling in Downlink Control Information (DCI).

The example of the present document further provides a base station, which comprises:

a configuration module, configured to: configure N Channel State Information (CSI) measurement processes used for measuring and feeding back CSI for a terminal, wherein, each of the N CSI measurement processes is independently configured with one or more of the following signalings through a terminal dedicated higher layer signaling: a codebook subset restriction, Precoding Matrix Indicator-Rank Indicator-Report (PMI-RI-Report), PMI feedback enabled, RI feedback enabled, RI feedback enabled according to reference process, PMI feedback enabled according to reference process, sub-band feedback enabled according to reference process, a feedback mode, a resource location fed back by Physical Uplink Control Channel (PUCCH) corresponding to CSI measurement process, subframe offset and cycle fed back by PUCCH corresponding to CSI measurement process, and an initialization sequence Identifier (ID) of PUCCH corresponding to CSI measurement process; and a sending module, configured to: send the N CSI measurement processes to the terminal, wherein N is a positive integer.

Alternatively, the configuration module is further configured to: configure one or more CSI processes corresponding to an aperiodic triggering state through a terminal dedicated higher layer signaling using a bitmap sequence; and trigger one or more CSI processes corresponding to each aperiodic triggering state through a 2-bit trigger signaling in Downlink Control Information (DCI).

Alternatively, one CSI measurement process only includes one CSI process, or includes a combination of one CSI process and one subframe set.

Alternatively, when one CSI process is configured with subframe set information, the CSI process is divided into two CSI measurement processes, a first CSI measurement process corresponds to a combination of the CSI process and a first subframe set in the subframe set information, and a second CSI measurement process corresponds to a combination of the CSI process and a second subframe set in the subframe set information.

The example of the present document further provides a terminal, which comprises:

a receiving module, configured to: receive N Channel State Information (CSI) measurement processes sent by a base station, wherein, each of the N CSI measurement processes is independently configured with one or more of the following signalings through a terminal dedicated higher layer signaling: a codebook subset restriction, Precoding Matrix Indicator-Rank Indicator-Report (PMI-RI-Report), PMI feedback enabled, RI feedback enabled, RI feedback enabled according to reference process, PMI feedback enabled according to reference process, sub-band feedback enabled according to reference process, a feedback mode, a resource location fed back by Physical Uplink Control Channel (PUCCH) corresponding to CSI measurement process, subframe offset and cycle fed back by PUCCH corresponding to CSI measurement process, and an initialization sequence Identifier (ID) of PUCCH corresponding to CSI measurement process; and a feedback module, configured to: measure CSI according to the N CSI measurement processes, and feed back a measurement report to the base station.

Alternatively, one CSI measurement process only includes one CSI process, or includes a combination of one CSI process and one subframe set.

Alternatively, when one CSI process is configured with subframe set information, the CSI process is divided into two CSI measurement processes, a first CSI measurement process corresponds to a combination of the CSI process and a first subframe set in the subframe set information, and a second CSI measurement process corresponds to a combination of the CSI process and a second subframe set in the subframe set information.

Alternatively, the measurement report includes one or more of the following contents: PMI, Channel Quality Information (CQI) and RI.

Alternatively, the feedback module is configured to feed back the measurement report to the base station by means of:

when determining that a collision occurs among a plurality of measurement reports required to be fed back, dropping measurement reports in turn according to a priority order of report type, CSI measurement process index and carrier index, and feeding back measurement reports that are not dropped.

Alternatively, the receiving module is further configured to: obtain one or more CSI processes corresponding to one aperiodic triggering state by receiving a terminal dedicated higher layer signaling using a bitmap sequence; and obtain a signaling for triggering one or more CSI processes corresponding to each aperiodic triggering state by detecting a 2-bit trigger signaling in Downlink Control Information (DCI).

The example of the present document further provides a method for configuring data demodulation, which comprises:

a base station configuring a corresponding relationship between N Channel State Information (CSI) measurement processes and demodulation pilot frequencies for a terminal, wherein, the corresponding relationship is used for indicating the terminal to use large-scale information and/or interference information corresponding to which CSI measurement process to perform pilot frequency demodulation and data detection on a subframe on which downlink services are currently received; wherein the large-scale information includes one or more of the following information: delay spread, each path delay, doppler frequency shift, doppler spread and average receiving power; and the base station sending the corresponding relationship to the terminal.

Alternatively, the CSI measurement process only includes one CSI process, or includes a combination of one CSI process and one subframe set.

Alternatively, when one CSI process is configured with subframe set information, the CSI process is divided into two CSI measurement processes, a first CSI measurement process corresponds to a combination of the CSI process and a first subframe set in the subframe set information, and a second CSI measurement process corresponds to a combination of the CSI process and a second subframe set in the subframe set information.

The example of the present document further provides a method for data demodulation, which comprises:

a terminal receiving a corresponding relationship between N Channel State Information (CSI) measurement processes and demodulation pilot frequencies sent by a base station; and the terminal determining to use large-scale information and/or interference information corresponding to which CSI measurement process to perform pilot frequency demodulation and data detection on a subframe on which downlink services are currently received according to the corresponding relationship, wherein, the large-scale information includes one or more of the following information: delay spread, each path delay, doppler frequency shift, doppler spread and average receiving power.

Alternatively, the CSI measurement process only includes one CSI process, or includes a combination of one CSI process and one subframe set.

Alternatively, when one CSI process is configured with subframe set information, the CSI process is divided into two CSI measurement processes, a first CSI measurement process corresponds to a combination of the CSI process and a first subframe set in the subframe set information, and a second CSI measurement process corresponds to a combination of the CSI process and a second subframe set in the subframe set information.

The example of the present document further provides a base station, which comprises:

a configuration module, configured to: configure a corresponding relationship between N Channel State Information (CSI) measurement processes and demodulation pilot frequencies for a terminal, wherein, the corresponding relationship is used for indicating the terminal to use large-scale information and/or interference information corresponding to which CSI measurement process to perform pilot frequency demodulation and data detection on a subframe on which downlink services are currently received; wherein the large-scale information includes one or more of the following information: delay spread, each path delay, doppler frequency shift, doppler spread and average receiving power; and a sending module, configured to: send the corresponding relationship to the terminal.

Alternatively, the CSI measurement process only includes one CSI process, or includes a combination of one CSI process and one subframe set.

Alternatively, when one CSI process is configured with subframe set information, the CSI process is divided into two CSI measurement processes, a first CSI measurement process corresponds to a combination of the CSI process and a first subframe set in the subframe set information, and a second CSI measurement process corresponds to a combination of the CSI process and a second subframe set in the subframe set information.

The example of the present document further provides a terminal, which comprises:

a receiving module, configured to: receive a corresponding relationship between N Channel State Information (CSI) measurement processes and demodulation pilot frequencies sent by a base station; and a processing module, configured to: determine to use large-scale information and/or interference information corresponding to which CSI measurement process to perform pilot frequency demodulation and data detection on a subframe on which downlink services are currently received according to the corresponding relationship, wherein, the large-scale information includes one or more of the following information: delay spread, each path delay, doppler frequency shift, doppler spread and average receiving power.

Alternatively, the CSI measurement process only includes one CSI process, or includes a combination of one CSI process and one subframe set.

Alternatively, when one CSI process is configured with subframe set information, the CSI process is divided into two CSI measurement processes, a first CSI measurement process corresponds to a combination of the CSI process and a first subframe set in the subframe set information, and a second CSI measurement process corresponds to a combination of the CSI process and a second subframe set in the subframe set information.

The example of the present document further provides a method for configuring antenna port information, which comprises:

a base station configuring an assumption about whether another one or more Demodulation Reference Signal (DMRS) antenna ports are used for enhanced Physical Downlink Control Channel (ePDCCH) and/or Physical Downlink Shared Channel (PDSCH) transmissions of another one or more users when ePDCCH resources are detected for a terminal; and the base station sending the assumption to the terminal through a terminal dedicated higher layer signaling and/or a physical layer signaling.

Alternatively, the step of a base station configuring an assumption about whether another one or more DMRS antenna ports are used for ePDCCH and/or PDSCH transmissions of another one or more users when ePDCCH resources are detected for a terminal comprises:

by configuring K ePDCCH detection sets, the base station independently configuring the terminal to assume about whether another one or more DMRS antenna ports are used for ePDCCH and/or PDSCH transmissions of another one user in the K ePDCCH detection sets, wherein K is a positive integer.

Alternatively, the step of a base station configuring an assumption about whether another one or more DMRS antenna ports are used for ePDCCH and/or PDSCH transmissions of another one or more users when ePDCCH resources are detected for a terminal comprises:

by configuring K ePDCCH detection sets, the base station configuring the terminal to assume about whether another one or more DMRS antenna ports are used for ePDCCH and/or PDSCH transmissions of another one or more users in part or all of the K ePDCCH detection sets, wherein K is a positive integer; or by configuring X subframe sets, the base station configuring the terminal to assume about whether another one or more DMRS antenna ports are used for ePDCCH and/or PDSCH transmissions of another one or more users in part or all of the X subframe sets, wherein X is a positive integer.

Alternatively, the K ePDCCH detection sets are uniformly or independently configured by the base station.

Alternatively, the another one or more DMRS antenna ports refer to one or more DMRS antenna ports except DMRS antenna ports used for ePDCCH transmission of a specified terminal; and the DMRS antenna ports used for the ePDCCH transmission of the specified terminal include: ports 107, 108, 109 and 110.

The example of the present document further provides a method for obtaining antenna port information, which comprises:

a terminal receiving a terminal dedicated higher layer signaling and/or a physical layer signaling sent by a base station; and the terminal obtaining an assumption about whether another one or more Demodulation Reference Signal (DMRS) antenna ports are used for enhanced Physical Downlink Control Channel (ePDCCH) and/or Physical Downlink Shared Channel (PDSCH) transmissions of another one or more users when ePDCCH resources are detected according to the terminal dedicated higher layer signaling and/or the physical layer signaling.

Alternatively, the step of the terminal obtaining an assumption about whether another one or more DMRS antenna ports are used for ePDCCH and/or PDSCH transmissions of another one or more users when ePDCCH resources are detected according to the terminal dedicated higher layer signaling and/or the physical layer signaling comprises:

the terminal obtaining configured K ePDCCH detection sets according to the terminal dedicated higher layer signaling, and receiving a higher layer signaling used for independently configuring the terminal to assume about whether another one or more DMRS antenna ports are used for ePDCCH and/or PDSCH transmissions of another one or more users in the K ePDCCH detection sets when the ePDCCH resources are detected, wherein K is a positive integer.

Alternatively, the step of the terminal obtaining an assumption about whether another one or more DMRS antenna ports are used for ePDCCH and/or PDSCH transmissions of another one or more users when ePDCCH resources are detected according to the terminal dedicated higher layer signaling and/or the physical layer signaling comprises:

the terminal obtaining configured K ePDCCH detection sets according to the terminal dedicated higher layer signaling, and obtaining a higher layer signaling used for configuring the terminal to assume about whether another one or more DMRS antenna ports are used for ePDCCH and/or PDSCH transmissions of another one or more users in part or all of the K ePDCCH detection sets when the ePDCCH resources are detected, wherein K is a positive integer; or the terminal obtaining configured X subframe sets according to the terminal dedicated higher layer signaling, and obtaining a higher layer signaling used for configuring the terminal to assume about whether another one or more DMRS antenna ports are used for ePDCCH and/or PDSCH transmissions of another one or more users in part or all of the X subframe sets when the ePDCCH resources are detected, wherein K is a positive integer.

Alternatively, the K ePDCCH detection sets are uniformly or independently obtained by the terminal.

Alternatively, the another one or more DMRS antenna ports refer to one or more DMRS antenna ports except DMRS antenna ports used for ePDCCH transmission of a specified terminal; and the DMRS antenna ports used for the ePDCCH transmission of the specified terminal include: ports 107, 108, 109 and 110.

The example of the present document further provides a base station, which comprises:

a configuration module, configured to: configure an assumption about whether another one or more Demodulation Reference Signal (DMRS) antenna ports are used for enhanced Physical Downlink Control Channel (ePDCCH) and/or Physical Downlink Shared Channel (PDSCH) transmissions of another one or more users when ePDCCH resources are detected for a terminal; and a sending module, configured to: send the assumption to the terminal through a terminal dedicated higher layer signaling and/or a physical layer signaling.

Alternatively, the configuration module is configured to:

by configuring K ePDCCH detection sets, independently configure the terminal to assume about whether another one or more DMRS antenna ports are used for ePDCCH and/or PDSCH transmissions of another one user in the K ePDCCH detection sets, wherein K is a positive integer.

Alternatively, the configuration module is configured to:

by configuring K ePDCCH detection sets, configure the terminal to assume about whether another one or more DMRS antenna ports are used for ePDCCH and/or PDSCH transmissions of another one or more users in part or all of the K ePDCCH detection sets, wherein K is a positive integer; or by configuring X subframe sets, configure the terminal to assume about whether another one or more DMRS antenna ports are used for ePDCCH and/or PDSCH transmissions of another one or more users in part or all of the X subframe sets, wherein X is a positive integer.

Alternatively, the K ePDCCH detection sets are uniformly or independently configured by the configuration module.

Alternatively, the another one or more DMRS antenna ports refer to one or more DMRS antenna ports except DMRS antenna ports used for ePDCCH transmission of a specified terminal; and the DMRS antenna ports used for the ePDCCH transmission of the specified terminal include: ports 107, 108, 109 and 110.

The example of the present document further provides a terminal, which comprises:

a receiving module, configured to: receive a terminal dedicated higher layer signaling and/or a physical layer signaling sent by a base station; and an obtaining module, configured to: obtain an assumption about whether another one or more Demodulation Reference Signal (DMRS) antenna ports are used for enhanced Physical Downlink Control Channel (ePDCCH) and/or Physical Downlink Shared Channel (PDSCH) transmissions of another one or more users when ePDCCH resources are detected according to the terminal dedicated higher layer signaling and/or the physical layer signaling.

Alternatively, the obtaining module is configured to:

obtain configured K ePDCCH detection sets according to the terminal dedicated higher layer signaling, and receive a higher layer signaling used for independently configuring the terminal to assume about whether another one or more DMRS antenna ports are used for ePDCCH and/or PDSCH transmissions of another one or more users in the K ePDCCH detection sets when the ePDCCH resources are detected, wherein K is a positive integer.

Alternatively, the obtaining module is configured to:

obtain configured K ePDCCH detection sets according to the terminal dedicated higher layer signaling, and obtain a higher layer signaling used for configuring the terminal to assume about whether another one or more DMRS antenna ports are used for ePDCCH and/or PDSCH transmissions of another one or more users in part or all of the K ePDCCH detection sets when the ePDCCH resources are detected, wherein K is a positive integer; or obtain configured X subframe sets according to the terminal dedicated higher layer signaling, and obtain a higher layer signaling used for configuring the terminal to assume about whether another one or more DMRS antenna ports are used for ePDCCH and/or PDSCH transmissions of another one or more users in part or all of the X subframe sets when the ePDCCH resources are detected, wherein K is a positive integer.

Alternatively, the K ePDCCH detection sets are uniformly or independently obtained by the obtaining module.

Alternatively, the another one or more DMRS antenna ports refer to one or more DMRS antenna ports except DMRS antenna ports used for ePDCCH transmission of a specified terminal; and the DMRS antenna ports used for the ePDCCH transmission of the specified terminal include: ports 107, 108, 109 and 110.

The example of the present document provides a method for obtaining antenna port information, which comprises:

a terminal determining whether it is required to assume about whether another one or more Demodulation Reference Signal (DMRS) antenna ports are used for enhanced Physical Downlink Control Channel (ePDCCH) or Physical Downlink Shared Channel (PDSCH) transmissions of another one or more terminals when ePDCCH resources are detected according to an ePDCCH transmission mode.

Alternatively, the step of a terminal determining whether it is required to assume about whether another one or more DMRS antenna ports are used for ePDCCH or PDSCH transmissions of another one or more terminals when ePDCCH resources are detected according to an ePDCCH transmission mode comprises:

when the terminal is configured as a centralized ePDCCH, the terminal always assuming that another one or more DMRS antenna ports are not used for ePDCCH or PDSCH transmissions of another one or more terminals when the ePDCCH resources are detected; or when the terminal is configured as a distributed ePDCCH, the terminal always assuming that another one or more DMRS antenna ports are used for ePDCCH or PDSCH transmissions of another one or more terminals when the ePDCCH resources are detected.

Alternatively, the another one or more DMRS antenna ports refer to one or more DMRS antenna ports except DMRS antenna ports used for ePDCCH transmission of a specified terminal; and the DMRS antenna ports used for the ePDCCH transmission of the specified terminal include: ports 107, 108, 109 and 110.

The example of the present document further provides a terminal, which comprises:

a determination module, configured to: determine whether it is required to assume about whether another one or more Demodulation Reference Signal (DMRS) antenna ports are used for enhanced Physical Downlink Control Channel (ePDCCH) or Physical Downlink Shared Channel (PDSCH) transmissions of another one or more terminals when ePDCCH resources are detected according to an ePDCCH transmission mode.

Alternatively, the determination module is configured to:

when the terminal is configured as a centralized ePDCCH, always assume that another one or more DMRS antenna ports are not used for ePDCCH or PDSCH transmissions of another one or more terminals when the ePDCCH resources are detected; or when the terminal is configured as a distributed ePDCCH, always assume that another one or more DMRS antenna ports are used for ePDCCH or PDSCH transmissions of another one or more terminals when the ePDCCH resources are detected.

Alternatively, the another one or more DMRS antenna ports refer to one or more DMRS antenna ports except DMRS antenna ports used for ePDCCH transmission of a specified terminal; and the DMRS antenna ports used for the ePDCCH transmission of the specified terminal include: ports 107, 108, 109 and 110.

The example of the present document further provides a method for obtaining antenna port information, which comprises:

a terminal always assuming that another one or more Demodulation Reference Signal (DMRS) antenna ports are not used for enhanced Physical Downlink Control Channel (ePDCCH) or Physical Downlink Shared Channel (PDSCH) transmissions of another one or more terminals when ePDCCH resources are detected.

Alternatively, the another one or more DMRS antenna ports refer to one or more DMRS antenna ports except DMRS antenna ports used for ePDCCH transmission of a specified terminal; and the DMRS antenna ports used for the ePDCCH transmission of the specified terminal include: ports 107, 108, 109 and 110.

The example of the present document further provides a terminal, which comprises:

a processing module, configured to: when enhanced Physical Downlink Control Channel (ePDCCH) resources are detected, always assume that another one or more Demodulation Reference Signal (DMRS) antenna ports are not used for ePDCCH or Physical Downlink Shared Channel (PDSCH) transmissions of another one or more terminals.

Alternatively, the another one or more DMRS antenna ports refer to one or more DMRS antenna ports except DMRS antenna ports used for ePDCCH transmission of a specified terminal; and the DMRS antenna ports used for the ePDCCH transmission of the specified terminal include: ports 107, 108, 109 and 110.

In the above example of the present document, more flexible scheduling configurations can be implemented, which enhances the self-adaptive capability and average performance of the system, improves an accuracy rate of the system detection, and avoids a problem of ePDCCH detection error caused by the terminal mistakenly detecting interference information of other ports.

PREFERRED EMBODIMENTS OF THE INVENTION

The examples of the present document will be described in detail in combination with the accompanying drawings below. It should be noted that the examples in the present document and the characteristics in the examples can be optionally combined with each other in the condition of no conflict.

Figure 1:
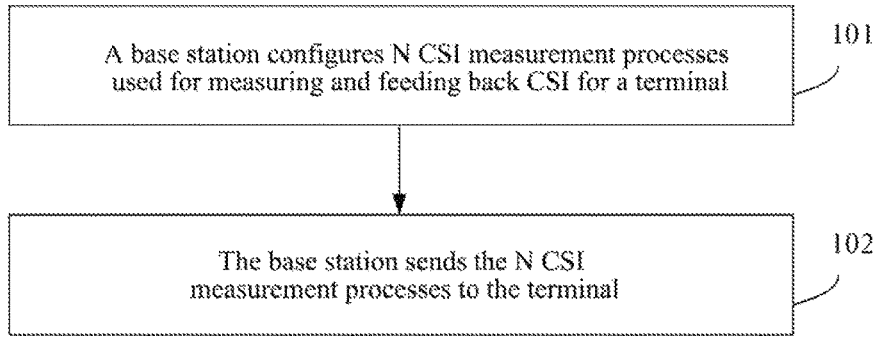
FIG. 1 is a flow diagram of a method for configuring channel state information feedback signalings according to the example of the present document.

The example of the present document provides a method for configuring channel state information feedback signalings, as shown in FIG. 1, the method is described from the aspect of base station side, and the method comprises the following steps.

In step 101, a base station configures N CSI measurement processes used for measuring and feeding back CSI for a terminal, wherein, each of the N CSI measurement processes is independently configured with one or more of the following signalings through a terminal dedicated higher layer signaling: a codebook subset restriction, PMI-RI-Report, PMI/RI feedback enabled, RI feedback enabled according to reference process, PMI feedback enabled according to reference process, sub-band feedback enabled according to reference process, a feedback mode, a resource location fed back by PUCCH corresponding to CSI measurement process, subframe offset and cycle fed back by PUCCH corresponding to CSI measurement process, and an initialization sequence ID of PUCCH corresponding to CSI measurement process.

In step 102, the base station sends the N CSI measurement processes to the terminal, wherein N is a positive integer.

Figure 2:
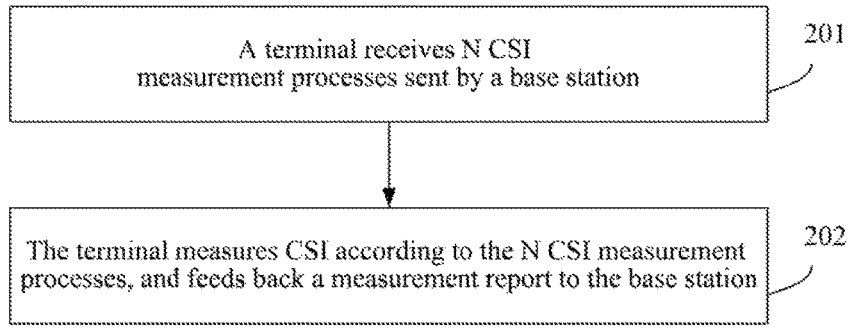
FIG. 2 is a flow diagram of a method for feeding back channel state information according to the example of the present document.

The example of the present document also provides a method for feeding back channel state information, as shown in FIG. 2, the method is described from the aspect of terminal side, and the method comprises the following steps.

In step 201, a terminal receives N CSI measurement processes sent by a base station, wherein, each of the N CSI measurement processes is independently configured with one or more of the following signalings through a terminal dedicated higher layer signaling: a codebook subset restriction, PMI-RI-Report, PMI/RI feedback enabled, RI feedback enabled according to reference process, PMI feedback enabled according to reference process, sub-band feedback enabled according to reference process, a feedback mode, a resource location fed back by PUCCH corresponding to CSI measurement process, subframe offset and cycle fed back by PUCCH corresponding to CSI measurement process, and an initialization sequence ID of PUCCH corresponding to CSI measurement process.

In step 202, the terminal measures CSI according to the N CSI measurement processes, and feeds back a measurement report to the base station.

With regard to the above example, one CSI measurement process only includes one CSI process, or includes a combination of one CSI process and one subframe set. When one CSI process is configured with subframe set information, the CSI process is divided into two CSI measurement processes, the first CSI measurement process corresponds to the combination of the CSI process and the first subframe set in the subframe set information, and the second CSI measurement process corresponds to the combination of the CSI process and the second subframe set in the subframe set information.

The CSI measurement process mentioned in the example of the present document is only to describe that the measurement process is a CSI process or a combination of the CSI process and the subframe set. A concept of the CSI measurement process may not be defined or the concept is indicated by using another name in practical standards or implementations, and the name of CSI measurement process is used only for an easy description in the example of the present document, which will not cause any limitations on design ideas of the example of the present document. The subframe set configuration information includes two subframe sets or two subframe set configurations, which respectively correspond to a subframe set 0 and a subframe set 1. One CSI process includes a combination of one NZP CSI-RS and one IMR, or the CSI process includes a combination of one NZP CSI-RS, one IMR and one interference compensation resource.

The technical scheme of the example of the present document will be described in detail from the aspect of interaction between the base station and the terminal below.

Example 1

The base station configures N CSI measurement processes for the terminal, and the N CSI measurement processes are used for respectively performing measurement and feedback of channel state information. Wherein the contents of measurement and feedback at least include one of PMI, CQI and RI; moreover, for each of the N CSI measurement processes, a codebook subset restriction is independently configured through a terminal dedicated higher layer signaling. When one CSI process is not configured with subframe set configuration information, one CSI measurement process corresponds to one CSI process. When one CSI process is configured with subframe set configuration information, one CSI measurement process corresponds to the combination of the CSI process and the first subframe set in the subframe set configuration information, and the other CSI measurement process corresponds to the combination of the CSI process and the second subframe set in the subframe set configuration information.

The terminal determines the measurement and feedback of the channel state information respectively performed by the terminal on the N CSI measurement processes by receiving the N CSI measurement processes. Wherein the contents of measurement and feedback at least include one of PMI, CQI and RI; moreover, for each of the N CSI measurement processes, a codebook subset restriction is independently determined by receiving the terminal dedicated higher layer signaling. The terminal determines a codebook subset restriction used when channel measurement is performed on the CSI measurement process according to the received codebook subset restriction.

Example 2

The base station configures N CSI measurement processes for the terminal, and the N CSI measurement processes are used for respectively performing measurement and feedback of channel state information. Wherein the contents of measurement and feedback at least include one of PMI, CQI and RI; moreover, for each of the N CSI measurement processes, PMI-RI-Report is independently configured through a terminal dedicated higher layer signaling. When one CSI process is not configured with subframe set configuration information, one CSI measurement process corresponds to one CSI process. When one CSI process is configured with subframe set configuration information, one CSI measurement process corresponds to the combination of the CSI process and the first subframe set in the subframe set configuration information, and the other CSI measurement process corresponds to the combination of the CSI process and the second subframe set in the subframe set configuration information.

The terminal determines the measurement and feedback of the channel state information respectively performed by the terminal on the N CSI measurement processes by receiving the N CSI measurement processes. Wherein the contents of measurement and feedback at least include one of PMI, CQI and RI; moreover, for each of the N CSI measurement processes, PMI-RI-Report is independently determined by receiving the terminal dedicated higher layer signaling. The terminal determines whether to feed back the RI and PMI when channel measurement and feedback are performed on the CSI measurement process according to the received PMI-RI-Report indication. When the PMI-RI-Report or PMI-RI-Report enabled are configured, the terminal performs feedback of the RI and PMI, and when the PMI-RI-Report or PMI-RI-Report enabled are not configured, the terminal does not perform feedback of the RI and PMI.

Example 3

The base station configures N CSI measurement processes for the terminal, and the N CSI measurement processes are used for respectively performing measurement and feedback of channel state information. Wherein the contents of measurement and feedback at least include one of PMI, CQI and RI; moreover, for each of the N CSI measurement processes, PMI/RI feedback enabled is independently configured through a terminal dedicated higher layer signaling. When one CSI process is not configured with subframe set configuration information, one CSI measurement process corresponds to one CSI process. When one CSI process is configured with subframe set configuration information, one CSI measurement process corresponds to the combination of the CSI process and the first subframe set in the subframe set configuration information, and the other CSI measurement process corresponds to the combination of the CSI process and the second subframe set in the subframe set configuration information.

The terminal determines the measurement and feedback of the channel state information respectively performed by the terminal on the N CSI measurement processes by receiving the N CSI measurement processes. Wherein the contents of measurement and feedback at least include one of PMI, CQI and RI; moreover, for each of the N CSI measurement processes, PMI/RI feedback enabled is independently determined by receiving the terminal dedicated higher layer signaling. The terminal determines whether to feed back the RI and PMI when channel measurement and feedback are performed on the CSI measurement process according to the received PMI/RI feedback enabled indication. When the PMI/RI feedback enabled is configured, the terminal performs feedback of the RI and PMI, and when the PMI/RI feedback enabled is not configured, the terminal does not perform feedback of the RI and PMI.

Example 4

The base station configures N CSI measurement processes for the terminal, and the N CSI measurement processes are used for respectively performing measurement and feedback of channel state information. Wherein the contents of measurement and feedback at least include one of PMI, CQI and RI; moreover, for each of the N CSI measurement processes, RI feedback enabled according to reference process is independently configured through a terminal dedicated higher layer signaling. When one CSI process is not configured with subframe set configuration information, one CSI measurement process corresponds to one CSI process. When one CSI process is configured with subframe set configuration information, one CSI measurement process corresponds to the combination of the CSI process and the first subframe set in the subframe set configuration information, and the other CSI measurement process corresponds to the combination of the CSI process and the second subframe set in the subframe set configuration information.

The terminal determines the measurement and feedback of the channel state information respectively performed by the terminal on the N CSI measurement processes by receiving the N CSI measurement processes. Wherein the contents of measurement and feedback at least include one of PMI, CQI and RI; moreover, for each of the N CSI measurement processes, RI feedback enabled according to reference process is independently determined by receiving the terminal dedicated higher layer signaling. The terminal determines whether to calculate PMI and/or CQI according to an RI of the configured reference CSI measurement process or an RI of the configured CSI process and feed back when channel measurement and feedback are performed on the CSI measurement process according to the received RI feedback enabled according to reference process indication. When the RI feedback enabled according to reference process is configured, the terminal calculates PMI and/or CQI according to the RI of the configured reference CSI measurement process or the RI of the configured CSI process and feeds back, and when the RI feedback enabled according to reference process is not configured, the terminal calculates RI according to the CSI measurement process and calculates PMI and/or CQI according to the calculated RI and feeds back.

Example 5

The base station configures N CSI measurement processes for the terminal, and the N CSI measurement processes are used for respectively performing measurement and feedback of channel state information. Wherein the contents of measurement and feedback at least include one of PMI, CQI and RI; moreover, for each of the N CSI measurement processes, PMI feedback enabled according to reference process is independently configured through a terminal dedicated higher layer signaling. When one CSI process is not configured with subframe set configuration information, one CSI measurement process corresponds to one CSI process. When one CSI process is configured with subframe set configuration information, one CSI measurement process corresponds to the combination of the CSI process and the first subframe set in the subframe set configuration information, and the other CSI measurement process corresponds to the combination of the CSI process and the second subframe set in the subframe set configuration information.

The terminal determines the measurement and feedback of the channel state information respectively performed by the terminal on the N CSI measurement processes by receiving the N CSI measurement processes. Wherein the contents of measurement and feedback at least include one of PMI, CQI and RI; moreover, for each of the N CSI measurement processes, PMI feedback enabled according to reference process is independently determined by receiving the terminal dedicated higher layer signaling. The terminal determines whether to calculate CQI according to a PMI of the configured reference CSI measurement process or a PMI of the configured CSI process and feed back when channel measurement and feedback are performed on the CSI measurement process according to the received PMI feedback enabled according to reference process indication. When the PMI feedback enabled according to reference process is configured, the terminal calculates CQI according to the PMI of the configured reference CSI measurement process or the PMI of the configured CSI process and feeds back, and when the PMI feedback enabled according to reference process is not configured, the terminal calculates RI and PMI according to the CSI measurement process and calculates CQI according to the calculated RI and PMI and feeds back.

Example 6

The base station configures N CSI measurement processes for the terminal, and the N CSI measurement processes are used for respectively performing measurement and feedback of channel state information. Wherein the contents of measurement and feedback at least include one of PMI, CQI and RI; moreover, for each of the N CSI measurement processes, sub-band feedback enabled according to reference process is independently configured through a terminal dedicated higher layer signaling. When one CSI process is not configured with subframe set configuration information, one CSI measurement process corresponds to one CSI process. When one CSI process is configured with subframe set configuration information, one CSI measurement process corresponds to the combination of the CSI process and the first subframe set in the subframe set configuration information, and the other CSI measurement process corresponds to the combination of the CSI process and the second subframe set in the subframe set configuration information.

The terminal determines the measurement and feedback of the channel state information respectively performed by the terminal on the N CSI measurement processes by receiving the N CSI measurement processes. Wherein the contents of measurement and feedback at least include one of PMI, CQI and RI; moreover, for each of the N CSI measurement processes, sub-band feedback enabled according to reference process is independently determined by receiving the terminal dedicated higher layer signaling. The terminal side determines whether to calculate RI and/or PMI and/or CQI according to a sub-band of the configured reference CSI measurement process or a sub-band of the configured CSI process and feed back when channel measurement and feedback are performed on the CSI measurement process according to the received sub-band feedback enabled according to reference process indication. When the sub-band feedback enabled according to reference process is configured, the terminal calculates RI and/or PMI and/or CQI according to the sub-band of the configured reference CSI measurement process or the sub-band of the configured CSI process and feeds back, and when the sub-band feedback enabled according to reference process is not configured, the terminal calculates RI and PMI of an optimal sub-band according to the CSI measurement process and calculates CQI according to the calculated RI and PMI and feeds back.

Example 7

The base station configures N CSI measurement processes for the terminal, and the N CSI measurement processes are used for respectively performing measurement and feedback of channel state information. Wherein the contents of measurement and feedback at least include one of PMI, CQI and RI; moreover, for each of the N CSI measurement processes, a feedback mode is independently configured through a terminal dedicated higher layer signaling. When one CSI process is not configured with subframe set configuration information, one CSI measurement process corresponds to one CSI process. When one CSI process is configured with subframe set configuration information, one CSI measurement process corresponds to the combination of the CSI process and the first subframe set in the subframe set configuration information, and the other CSI measurement process corresponds to the combination of the CSI process and the second subframe set in the subframe set configuration information.

The terminal determines the measurement and feedback of the channel state information respectively performed by the terminal on the N CSI measurement processes by receiving the N CSI measurement processes. Wherein the contents of measurement and feedback at least include one of PMI, CQI and RI; moreover, for each of the N CSI measurement processes, a feedback mode is independently determined by receiving the terminal dedicated higher layer signaling. The terminal determines a feedback mode used when channel measurement and feedback are performed on the CSI measurement process according to the received feedback mode indication. The terminal calculates RI and/or PMI and/or CQI for the CSI measurement process according to the configured feedback mode and feeds back.

Example 8

The base station configures one or more CSI measurement processes through a terminal dedicated higher layer signaling, and then configures one or more CSI processes corresponding to an aperiodic triggering state through a terminal dedicated higher layer signaling using a bitmap sequence. The base station triggers one or more CSI processes corresponding to each aperiodic triggering state through a 2-bit trigger signaling in DCI.

The terminal obtains one or more CSI measurement processes by receiving the terminal dedicated higher layer signaling, and then obtains one or more CSI processes corresponding to one aperiodic triggering state by receiving a terminal dedicated higher layer signaling using a bitmap sequence. The terminal obtains a signaling for triggering one or more CSI processes corresponding to each aperiodic triggering state by detecting the 2-bit trigger signaling in the DCI. Thus the terminal performs feedback of aperiodic CSI report according to the received trigger signaling.

Figure 3A:
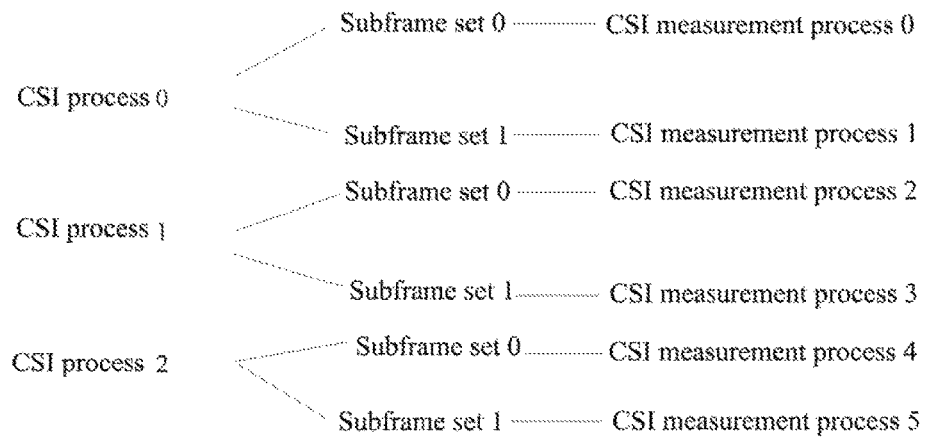
FIG. 3a is a schematic diagram 1 of a CSI measurement process adopted in the example of the present document.
Figures 3B, 4A, 4B:
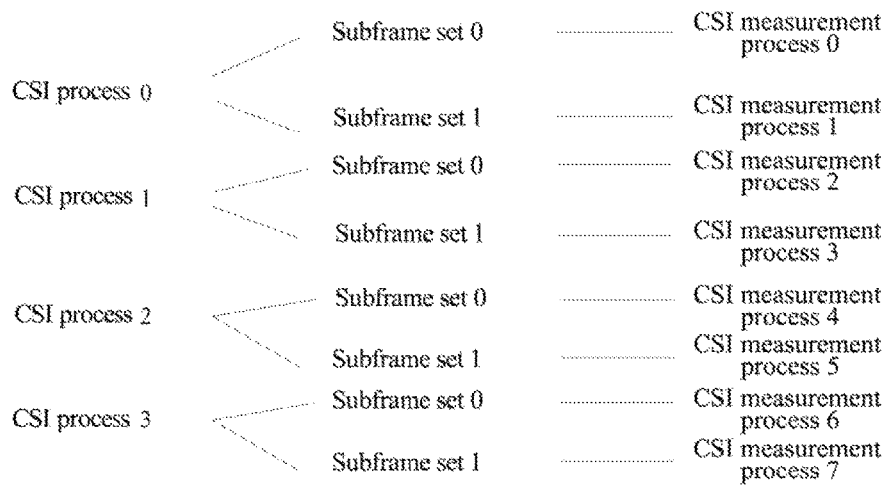
FIG. 3b is a schematic diagram 1 of a CSI report state adopted in the example of the present document.
FIG. 4a is a schematic diagram 2 of a CSI measurement process adopted in the example of the present document.
FIG. 4b is a schematic diagram 2 of a CSI report state adopted in the example of the present document.

The signaling design is as shown in FIG. 3a, it is assumed that 3 CSI processes are configured, each CSI process is configured with two subframe sets, and 6 CSI measurement processes, namely a CSI measurement process 0, a CSI measurement process 1, a CSI measurement process 2, a CSI measurement process 3, a CSI measurement process 4 and a CSI measurement process 5, are altogether constituted. Each CSI report state is notified by a terminal dedicated higher layer signaling of an additional bitmap sequence, for example, the 6 CSI measurement processes need a bitmap sequence with a bit length of 6 bits, and as shown in FIG. 3b, each bit in the bitmap sequence represents that whether one CSI measurement process is included in a CSI report state corresponding to the CSI measurement process, if not included, a bit value corresponding to the CSI measurement process is 0, and if included, the bit value corresponding to the CSI measurement process is 1. A corresponding relationship between the 2-bit DCI and the CSI report state is as shown in Table 4.

TABLE 4

| A corresponding relationship between 2-bit DCI and CSI report state ||
| --- | --- |
| Aperiodic feedback 2-bit DCI | CSI report state |
| 00 | No aperiodic feedback |
| 01 | CSI report state 1 |
| 10 | CSI report state 2 |
| 11 | CSI report state 3 |

Or, the signaling design is as shown in FIG. 4b, it is assumed that 4 CSI processes are configured, each CSI process is configured with two subframe sets, and 8 CSI measurement processes, namely a CSI measurement process 0, a CSI measurement process 1, a CSI measurement process 2, a CSI measurement process 3, a CSI measurement process 4, a CSI measurement process 5, a CSI measurement process 6 and a CSI measurement process 7, are altogether constituted. Each CSI report state is notified by a terminal dedicated higher layer signaling of an additional bitmap sequence, for example, the 8 CSI measurement processes need a bitmap sequence with a bit length of 8 bits, and as shown in FIG. 4b, each bit in the bitmap sequence represents that whether one CSI measurement process is included in a CSI report state corresponding to the CSI measurement process, if not included, a bit value corresponding to the CSI measurement process is 0, and if included, the bit value corresponding to the CSI measurement process is 1. A corresponding relationship between the 2-bit DCI and the CSI report state is as shown in the above Table 4.

Example 9

The base station configures one or more CSI measurement processes through a terminal dedicated higher layer signaling, and configures the terminal to periodically feed back according to one or more CSI measurement processes.

When a collision occurs among a plurality of CSI reports fed back by the terminal, dropping of CSI reports is performed according to the following priorities:

report type➔ CSI measurement process index➔ carrier index; that is, a CSI report with a lower-priority report type is firstly dropped, if report types are the same, a CSI report with a lower-priority CSI measurement process index is dropped, and if CSI measurement process indexes are the same, a CSI report with a lower-priority carrier index is dropped.

Example 10

The base station configures N CSI processes for the terminal, and the N CSI processes are used for respectively performing measurement and feedback of channel state information. For each of the N CSI processes, a resource location fed back by PUCCH corresponding to CSI process is independently configured through a terminal dedicated higher layer signaling.

The terminal determines the measurement and feedback of the channel state information respectively performed by the terminal on the N CSI processes by receiving the N CSI processes. For each of the N CSI processes, the resource location fed back by PUCCH corresponding to CSI process is independently determined by receiving the terminal dedicated higher layer signaling. The terminal determines a resource location fed back in uplink with regard to the CSI process according to the received resource location fed back by PUCCH corresponding to CSI process.

Wherein, the resource location fed back by PUCCH corresponds to $n_{PUCCH}^{(2,p\ \%)}$ in the standard, $p^{\%}$ is an antenna port index for sending the PUCCH.

Example 11

The base station configures N CSI processes for the terminal, and the N CSI processes are used for respectively performing measurement and feedback of channel state information. For each of the N CSI processes, an initialization sequence ID of PUCCH corresponding to CSI process is independently configured through a terminal dedicated higher layer signaling.

The terminal determines the measurement and feedback of the channel state information respectively performed by the terminal on the N CSI processes by receiving the N CSI processes. For each of the N CSI processes, the initialization sequence ID of PUCCH corresponding to CSI process is independently determined by receiving the terminal dedicated higher layer signaling.

Wherein, the initialization sequence ID of PUCCH is used for generating a basic sequence $r_{u,v}^{(\alpha_p\ \%)}$ of the PUCCH (corresponding to a basic sequence representation in chapter 36.211 5.4.2 in the standard) and a sequence cyclic shift. Wherein a group number of the basic sequence is given by u:

$$u=(f_{gh}(n_s)+f_{ss}) \bmod 30;$$

wherein, a group hopping pattern $f_{gh}(n_s)$ is generated through the following formula:

$$f_{gh}(n_s) = \begin{cases} 0 \\ \left(\sum_{i=0}^{7} c(8n_s + i) \cdot 2^i\right) \bmod 30 \end{cases}$$

wherein, a pseudorandom sequence c(i) is generated by a generator that generates the pseudorandom sequence in chapter 36.211 7.2; an initialization factor $c_{init}$ is generated through the formula $$c_{init} = \left\lfloor \frac{n_{ID}^{RS}}{30} \right\rfloor,$$

wherein, $n_{ID}^{RS}$ is the configured initialization sequence ID of PUCCH, and $c_{init}$ is initialized at the beginning of each radio frame.

A sequence shift pattern $f_{ss}$ is calculated through the formula $f_{ss}^{PUCCH}=n_{ID}^{RS} \bmod 30$, wherein, $n_{ID}^{RS}$ is the configured initialization sequence ID of PUCCH, and $c_{init}$ is initialized at the beginning of each radio frame.

With regard to the PUCCH format, by using a basic sequence cyclic shift $n_{cs}^{cell}(n_s,l)$, change is made based on each symbol and time slot:

$$n_{cs}^{cell}(n_s,l)=\Sigma_{i=0}^{7}c(8N_{symb}^{UL} \cdot n_s+8l+i) \cdot 2^i;$$

wherein, a pseudorandom sequence c(i) is generated by the generator that generates the pseudorandom sequence in chapter 36.211 7.2; an initialization factor $c_{init}$ of the pseudorandom sequence c(i) is given through the formula $c_{init}=n_{ID}^{RS}$.

Wherein, $n_{ID}^{RS}$ is the initialization sequence ID of PUCCH, and the $n_{ID}^{RS}$ also can be called $n_{ID}^{PUCCH,RS}$ or $n_{ID}^{PUCCH}$, and such name does not limit the idea of the example of the present document.

Example 12

The base station configures N CSI measurement processes for the terminal, and the N CSI measurement processes are used for respectively performing measurement and feedback of channel state information. For each of the N CSI measurement processes, a resource location fed back by PUCCH corresponding to CSI measurement process is independently configured through a terminal dedicated higher layer signaling.

The terminal determines the measurement and feedback of the channel state information respectively performed by the terminal on the N CSI measurement processes by receiving the N CSI measurement processes. For each of the N CSI measurement processes, the resource location fed back by PUCCH corresponding to CSI measurement process is independently determined by receiving the terminal dedicated higher layer signaling. The terminal determines a resource location fed back in uplink with regard to the CSI measurement process according to the received resource location fed back by PUCCH corresponding to CSI measurement process.

Wherein, the resource location fed back by PUCCH corresponds to $n_{PUCCH}^{(2,\tilde{p})}$ in the standard, wherein $\tilde{p}$ is an antenna port index for sending the PUCCH.

The CSI measurement process includes one CSI process or a combination of one CSI process and one subframe set. When one CSI process is not configured with subframe set configuration information, one CSI measurement process corresponds to one CSI process. When one CSI process is configured with subframe set configuration information, one CSI measurement process corresponds to the combination of the CSI process and the first subframe set in the subframe set configuration information, and the other CSI measurement process corresponds to the combination of the CSI process and the second subframe set in the subframe set configuration information.

Example 13

The base station configures N CSI measurement processes for the terminal, and the N CSI measurement processes are used for respectively performing measurement and feedback of channel state information. For each of the N CSI measurement processes, an initialization sequence ID of PUCCH corresponding to CSI measurement process is independently configured through a terminal dedicated higher layer signaling.

The terminal determines the measurement and feedback of the channel state information respectively performed by the terminal on the N CSI measurement processes by receiving the N CSI measurement processes. For each of the N CSI measurement processes, the initialization sequence ID of PUCCH corresponding to CSI measurement process is independently determined by receiving the terminal dedicated higher layer signaling.

Wherein, the initialization sequence ID of PUCCH is used for generating a basic sequence $r_{u,v}^{(\alpha_p)}$ of the PUCCH (corresponding to a basic sequence representation in chapter 36.211 5.4.2 in the standard) and a sequence cyclic shift. Wherein a group number of the basic sequence is given by u:

$$u=(f_{gh}(n_s)+f_{ss}) \bmod 30;$$

wherein, a group hopping pattern $f_{gh}(n_s)$ is generated through the following formula:

$$f_{gh}(n_s) = \begin{cases} 0 \\ \left(\sum_{i=0}^{7} c(8n_s+i) \cdot 2^i\right) \bmod 30 \end{cases}$$

wherein, a pseudorandom sequence c(i) is generated by a generator that generates the pseudorandom sequence in chapter 36.211 7.2; an initialization factor $c_{init}$ is generated through the formula $$c_{init} = \left\lfloor \frac{n_{ID}^{RS}}{30} \right\rfloor,$$

wherein, $n_{ID}^{RS}$ is the configured initialization sequence ID of PUCCH, and $c_{init}$ is initialized at the beginning of each radio frame.

A sequence shift pattern $f_{ss}$ is calculated through the formula $f_{ss}^{PUCCH}=n_{ID}^{RS} \bmod 30$, wherein, $n_{ID}^{RS}$ is the configured initialization sequence ID of PUCCH, and $c_{init}$ is initialized at the beginning of each radio frame.

With regard to the PUCCH format, by using a basic sequence cyclic shift $n_{cs}^{cell}(n_s,l)$, change is made based on each symbol and time slot:

$$n_{cs}^{cell}(n_s,l)=\Sigma_{i=0}^{7} c(8N_{symb}^{UL} \cdot n_s+8l+i) \cdot 2^i;$$

wherein, a pseudorandom sequence c(i) is generated by the generator that generates the pseudorandom sequence in chapter 36.211 7.2; an initialization factor $c_{init}$ of the pseudorandom sequence c(i) is given through $c_{init}=n_{ID}^{RS}$.

Wherein, $n_{ID}^{RS}$ is the initialization sequence ID of PUCCH, and the $n_{ID}^{RS}$ also can be called $n_{ID}^{PUCCH,RS}$ or $n_{ID}^{PUCCH}$, and such name does not limit the idea of the example of the present document.

The CSI measurement process includes one CSI process or a combination of one CSI process and one subframe set. When one CSI process is not configured with subframe set configuration information, one CSI measurement process corresponds to one CSI process. When one CSI process is configured with subframe set configuration information, one CSI measurement process corresponds to the combination of the CSI process and the first subframe set in the subframe set configuration information, and the other CSI measurement process corresponds to the combination of the CSI process and the second subframe set in the subframe set configuration information.

Example 14

The base station configures N CSI processes for the terminal, and the N CSI processes are used for respectively performing measurement and feedback of channel state information. For each of the N CSI processes, subframe offset and cycle fed back by PUCCH corresponding to CSI process are independently configured through a terminal dedicated higher layer signaling.

The terminal determines the measurement and feedback of the channel state information respectively performed by the terminal on the N CSI processes by receiving the N CSI processes. For each of the N CSI processes, the subframe offset and cycle fed back by PUCCH corresponding to CSI process are independently determined by receiving the terminal dedicated higher layer signaling. The terminal determines subframe offset and cycle fed back in uplink with regard to the CSI process according to the received subframe offset and cycle fed back by PUCCH corresponding to CSI process.

Example 15

The base station configures N CSI measurement processes for the terminal, and the N CSI measurement processes are used for respectively performing measurement and feedback of channel state information. For each of the N CSI measurement processes, subframe offset and cycle fed back by PUCCH corresponding to CSI measurement process are independently configured through a terminal dedicated higher layer signaling.

The terminal determines the measurement and feedback of the channel state information respectively performed by the terminal on the N CSI measurement processes by receiving the N CSI measurement processes. For each of the N CSI measurement processes, the subframe offset and cycle fed back by PUCCH corresponding to CSI measurement process are independently determined by receiving the terminal dedicated higher layer signaling. The terminal determines subframe offset and cycle fed back in uplink with regard to the CSI measurement process according to the received subframe offset and cycle fed back by PUCCH corresponding to CSI measurement process.

In the above examples, it enables the base station and the terminal to configure different higher layer signalings such as the codebook subset restriction, PMI-RI-Report, PMI feedback enabled, RI feedback enabled, RI feedback enabled according to reference process, PMI feedback enabled according to reference process, sub-band feedback enabled according to reference process, the feedback mode, the resource location fed back by PUCCH corresponding to CSI measurement process, the subframe offset and cycle fed back by PUCCH corresponding to CSI measurement process, and the initialization sequence ID of PUCCH corresponding to CSI measurement process and so on with regard to CSI corresponding to different interference situations and transmission modes, thus more flexible scheduling configurations are implemented, which enhances a self-adaptive capability and average performance of the system.

Figure 5:
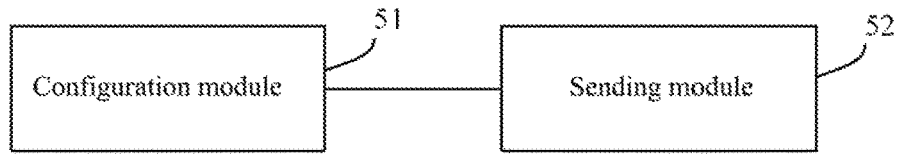
FIG. 5 is a schematic diagram of a structure of a base station according to the example of the present document.

As shown in FIG. 5, it is a schematic diagram of a structure of a base station according to the example of the present document, the base station comprises a configuration module 51 and a sending module 52, wherein:

the configuration module 51 is configured to: configure N CSI measurement processes used for measuring and feeding back CSI for a terminal, wherein, each of the N CSI measurement processes is independently configured with one or more of the following signalings through a terminal dedicated higher layer signaling: a codebook subset restriction, PMI-RI-Report, PMI/RI feedback enabled, RI feedback enabled according to reference process, PMI feedback enabled according to reference process, sub-band feedback enabled according to reference process, a feedback mode, a resource location fed back by PUCCH corresponding to CSI measurement process, subframe offset and cycle fed back by PUCCH corresponding to CSI measurement process, and an initialization sequence ID of PUCCH corresponding to CSI measurement process; and a sending module 52 is configured to: send the N CSI measurement processes to the terminal, wherein N is a positive integer.

In addition, the configuration module 51 is further configured to: configure one or more CSI processes corresponding to an aperiodic triggering state through a terminal dedicated higher layer signaling using a bitmap sequence; and trigger one or more CSI processes corresponding to each aperiodic triggering state through a 2-bit trigger signaling in DCI.

Wherein, one CSI measurement process only includes one CSI process, or includes a combination of one CSI process and one subframe set. When one CSI process is configured with subframe set information, the CSI process is divided into two CSI measurement processes, the first CSI measurement process corresponds to the combination of the CSI process and the first subframe set in the subframe set information, and the second CSI measurement process corresponds to the combination of the CSI process and the second subframe set in the subframe set information. When one CSI process is not configured with subframe set information, one CSI measurement process corresponds to one CSI process.

The above base station configures different higher layer signalings such as the codebook subset restriction, PMI-RI-Report, PMI/RI feedback enabled, RI feedback enabled according to reference process, PMI feedback enabled according to reference process, sub-band feedback enabled according to reference process, the feedback mode, the resource location fed back by PUCCH corresponding to CSI measurement process, the subframe offset and cycle fed back by PUCCH corresponding to CSI measurement process, and the initialization sequence ID of PUCCH corresponding to CSI measurement process and so on with regard to CSI corresponding to different interference situations and transmission modes, thus more flexible scheduling configurations are implemented, which enhances a self-adaptive capability and average performance of the system.

Figure 6:
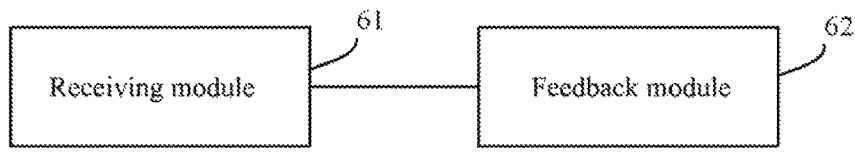
FIG. 6 is a schematic diagram of a structure of a terminal according to the example of the present document.

As shown in FIG. 6, it is a schematic diagram of a structure of a terminal according to the example of the present document, the terminal comprises a receiving module 61 and a feedback module 62, wherein:

the receiving module 61 is configured to: receive N CSI measurement processes sent by a base station, wherein, each of the N CSI measurement processes is independently configured with one or more of the following signalings through a terminal dedicated higher layer signaling: a codebook subset restriction, PMI-RI-Report, PMI feedback enabled, RI feedback enabled, RI feedback enabled according to reference process, PMI feedback enabled according to reference process, sub-band feedback enabled according to reference process, a feedback mode, a resource location fed back by PUCCH corresponding to CSI measurement process, subframe offset and cycle fed back by PUCCH corresponding to CSI measurement process, and an initialization sequence ID of PUCCH corresponding to CSI measurement process; and the feedback module 62 is configured to: measure CSI according to the N CSI measurement processes, and feed back a measurement report to the base station.

Wherein, one CSI measurement process only includes one CSI process, or includes a combination of one CSI process and one subframe set information. When one CSI process is configured with subframe set information, the CSI process is divided into two CSI measurement processes, the first CSI measurement process corresponds to the combination of the CSI process and the first subframe set in the subframe set information, and the second CSI measurement process corresponds to the combination of the CSI process and the second subframe set in the subframe set information.

Moreover, the measurement report includes one or more of the following contents: PMI, CQI and RI.

Alternatively, the feedback module is configured to feed back the measurement report to the base station in the following way: when determining that a collision occurs among a plurality of measurement reports required to be fed back, dropping measurement reports in turn according to a priority order of report type, CSI measurement process index and carrier index, and feeding back measurement reports that are not dropped.

Alternatively, the receiving module is further configured to: obtain one or more CSI processes corresponding to one aperiodic triggering state by receiving a terminal dedicated higher layer signaling using a bitmap sequence; and obtain a signaling for triggering one or more CSI processes corresponding to each aperiodic triggering state by detecting a 2-bit trigger signaling in DCI.

The above terminal can complete the feedback of CSI reports through cooperation with the base station.

Figure 7:
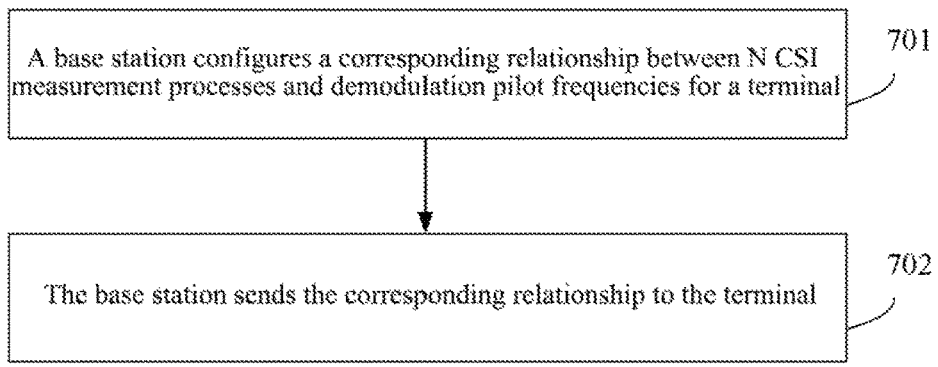
FIG. 7 is a flow diagram of a method for configuring data demodulation according to the example of the present document.

The example of the present document also provides a method for configuring data demodulation, the method is described from the aspect of base station side, and as shown in FIG. 7, the method comprises the following steps.

In step 701, a base station configures a corresponding relationship between N CSI measurement processes and demodulation pilot frequencies for a terminal, wherein, the corresponding relationship is used for indicating the terminal to use large-scale information and/or interference information corresponding to which CSI measurement process to perform pilot frequency demodulation and data detection on a subframe on which downlink services are currently received; wherein the large-scale information includes one or more of the following information: delay spread, each path delay, doppler frequency shift, doppler spread and average receiving power.

In step 702, the base station sends the corresponding relationship to the terminal.

Wherein, the CSI measurement process only includes one CSI process, or includes a combination of one CSI process and one subframe set. When one CSI process is configured with subframe set information, the CSI process is divided into two CSI measurement processes, the first CSI measurement process corresponds to the combination of the CSI process and the first subframe set in the subframe set information, and the second CSI measurement process corresponds to the combination of the CSI process and the second subframe set in the subframe set information. When one CSI process is not configured with subframe set information, one CSI measurement process corresponds to one CSI process.

Figure 8:
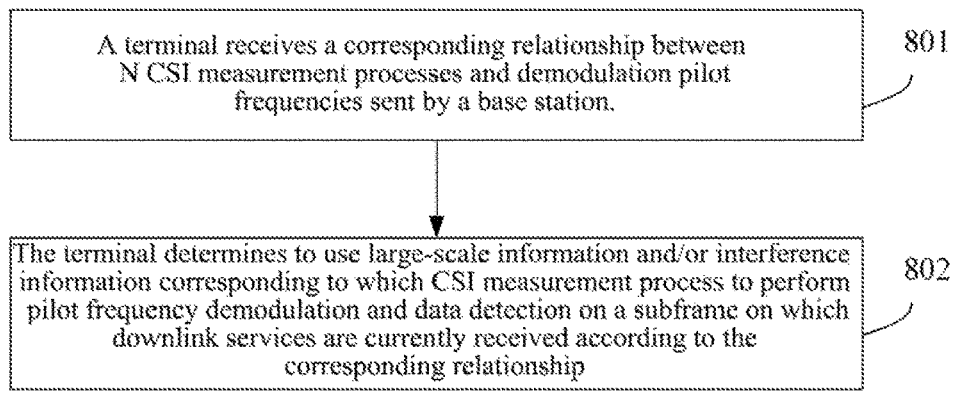
FIG. 8 is a flow diagram of a method for data demodulation according to the example of the present document.

As shown in FIG. 8, FIG. 8 is a flow diagram of a method for data demodulation according to the example of the present document, and the method for data demodulation comprises the following steps.

In step 801, a terminal receives a corresponding relationship between N CSI measurement processes and demodulation pilot frequencies sent by a base station.

In step 802, the terminal determines to use large-scale information and/or interference information corresponding to which CSI measurement process to perform pilot frequency demodulation and data detection on a subframe on which downlink services are currently received according to the corresponding relationship, wherein, the large-scale information includes one or more of the following information: delay spread, each path delay, doppler frequency shift, doppler spread and average receiving power.

Wherein, the CSI measurement process only includes one CSI process, or includes a combination of one CSI process and one subframe set. When one CSI process is configured with subframe set information, the CSI process is divided into two CSI measurement processes, the first CSI measurement process corresponds to the combination of the CSI process and the first subframe set in the subframe set information, and the second CSI measurement process corresponds to the combination of the CSI process and the second subframe set in the subframe set information. When one CSI process is not configured with subframe set information, one CSI measurement process corresponds to one CSI process.

The technical scheme of the example of the present document will be described in detail from the aspect of interaction between the base station and the terminal below.

Example 16

By configuring a corresponding relationship between N CSI measurement processes and demodulation pilot frequencies for a terminal, a base station indicates the terminal to use large-scale information and/or interference information corresponding to which CSI measurement process to perform pilot frequency demodulation and data detection on a subframe on which downlink services are currently received. Wherein the large-scale information at least includes one of the following information:

delay spread corresponding to CSI measurement process, each path delay corresponding to CSI measurement process, doppler frequency shift corresponding to CSI measurement process, doppler spread corresponding to CSI measurement process and average receiving power corresponding to CSI measurement process.

By receiving the corresponding relationship between the N CSI measurement processes and the demodulation pilot frequencies and through dynamic bits in the downlink control channel, the terminal determines that the terminal uses the large-scale information and/or interference information corresponding to which CSI measurement process to perform pilot frequency demodulation and data detection on the subframe on which downlink services are currently received. Wherein the large-scale information at least includes one of the following information:

delay spread corresponding to CSI measurement process, each path delay corresponding to CSI measurement process, doppler frequency shift corresponding to CSI measurement process, doppler spread corresponding to CSI measurement process and average receiving power corresponding to CSI measurement process.

The CSI measurement process includes one CSI process or a combination of one CSI process and one subframe set. When one CSI process is configured with subframe set information, the CSI process is divided into two CSI measurement processes, the first CSI measurement process corresponds to the combination of the CSI process and the first subframe set in the subframe set information, and the second CSI measurement process corresponds to the combination of the CSI process and the second subframe set in the subframe set information. When one CSI process is not configured with subframe set information, one CSI measurement process corresponds to one CSI process.

In the above examples, the CSI measurement process and the DMRS demodulation are configured associatively, and large-scale information of different CSI measurement processes is used to perform pilot frequency demodulation and data detection, which improves an accuracy rate of the system detection.

Figure 9:
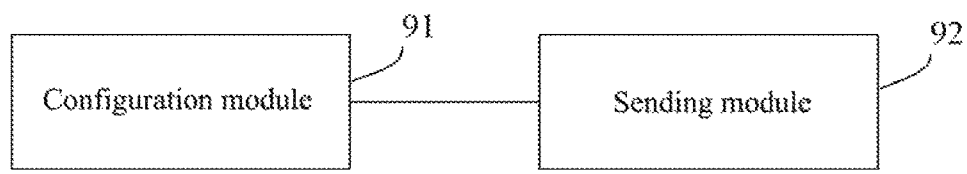
FIG. 9 is another schematic diagram of a structure of a base station according to the example of the present document.

As shown in FIG. 9, it is another schematic diagram of a structure of a base station according to the example of the present document; and the base station comprises a configuration module 91 and a sending module 92, wherein:

the configuration module 91 is configured to: configure a corresponding relationship between N CSI measurement processes and demodulation pilot frequencies for a terminal, wherein, the corresponding relationship is used for indicating the terminal to use large-scale information and/or interference information corresponding to which CSI measurement process to perform pilot frequency demodulation and data detection on a subframe on which downlink services are currently received; wherein the large-scale information includes one or more of the following information: delay spread, each path delay, doppler frequency shift, doppler spread and average receiving power; and the sending module 92 is configured to: send the corresponding relationship to the terminal.

Wherein, the CSI measurement process only includes one CSI process, or includes a combination of one CSI process and one subframe set. When one CSI process is configured with subframe set information, the CSI process is divided into two CSI measurement processes, the first CSI measurement process corresponds to the combination of the CSI process and the first subframe set in the subframe set information, and the second CSI measurement process corresponds to the combination of the CSI process and the second subframe set in the subframe set information. When one CSI process is not configured with subframe set information, one CSI measurement process corresponds to one CSI process.

For the above base station, the CSI measurement process and the DMRS demodulation are configured associatively, thus the terminal is enabled to use large-scale information of different CSI measurement processes to perform pilot frequency demodulation and data detection, which improves an accuracy rate of the system detection.

Figure 10:
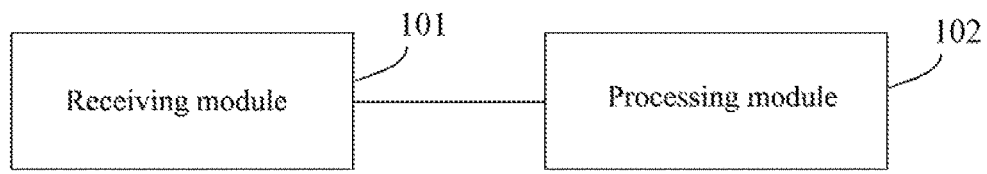
FIG. 10 is another schematic diagram of a structure of a terminal according to the example of the present document.

As shown in FIG. 10, it is another schematic diagram of a structure of a terminal according to the example of the present document. The terminal comprises a receiving module 101 and a processing module 102, wherein:

the receiving module 101 is configured to: receive a corresponding relationship between N CSI measurement processes and demodulation pilot frequencies sent by a base station; and the processing module 102 is configured to: determine to use large-scale information and/or interference information corresponding to which CSI measurement process to perform pilot frequency demodulation and data detection on a subframe on which downlink services are currently received according to the corresponding relationship, wherein, the large-scale information includes one or more of the following information: delay spread, each path delay, doppler frequency shift, doppler spread and average receiving power.

Wherein, the CSI measurement process only includes one CSI process, or includes a combination of one CSI process and one subframe set. When one CSI process is configured with subframe set information, the CSI process is divided into two CSI measurement processes, the first CSI measurement process corresponds to the combination of the CSI process and the first subframe set in the subframe set information, and the second CSI measurement process corresponds to the combination of the CSI process and the second subframe set in the subframe set information. When one CSI process is not configured with subframe set information, one CSI measurement process corresponds to one CSI process.

By interacting with the base station, the above terminal can use large-scale information of different CSI measurement processes to perform pilot frequency demodulation and data detection, which improves an accuracy rate of the system detection.

The example of the present document also provides a method for configuring antenna port information, the method is described from the aspect of base station side, and the method comprises the following steps.

In step 11, a base station configures an assumption about whether another one or more DMRS antenna ports are used for ePDCCH and/or PDSCH transmissions of another one or more users when ePDCCH resources are detected for a terminal.

In step 12, the base station sends the assumption to the terminal through a terminal dedicated higher layer signaling and/or a physical layer signaling.

The example of the present document also provides a method for obtaining antenna port information, the method is described from the aspect of terminal side, and the method comprises the following steps.

In step 21, a terminal receives a terminal dedicated higher layer signaling and/or a physical layer signaling sent by a base station.

In step 22, the terminal obtains an assumption about whether another one or more DMRS antenna ports are used for ePDCCH and/or PDSCH transmissions of another one or more users when ePDCCH resources are detected according to the terminal dedicated higher layer signaling and/or the physical layer signaling.

Wherein, the above another one or more DMRS antenna ports refer to one or more DMRS antenna ports except DMRS antenna ports used for ePDCCH transmission of a specified terminal; and the DMRS antenna ports used for the ePDCCH transmission of the specified terminal include: ports 107, 108, 109 and 110.

The technical scheme of the example of the present document will be described in detail from the aspect of interaction between the base station and the terminal below.

Example 17

Through a terminal dedicated higher layer signaling and/or a physical layer signaling, a base station notifies one ePDCCH terminal to assume about whether another one or more DMRS antenna ports are used for ePDCCH and/or PDSCH transmissions of another one or more users when ePDCCH resources are detected.

By receiving the terminal dedicated higher layer signaling and/or the physical layer signaling, a terminal obtains that one ePDCCH terminal assumes about whether another one or more DMRS antenna ports are used for ePDCCH and/or PDSCH transmissions of another one or more users when the ePDCCH resources are detected.

Wherein, the another one or more DMRS antenna ports refer to one or more DMRS antenna ports except DMRS antenna ports used for ePDCCH transmission of a specified terminal; and the DMRS antenna ports used for the ePDCCH transmission of the specified terminal include: ports 107, 108, 109 and 110.

Sub-Example 1 of Example 17

By configuring K ePDCCH detection sets, a base station independently configures a terminal to assume about whether another one or more DMRS antenna ports are used for ePDCCH and/or PDSCH transmissions of another one user in the K ePDCCH detection sets. Wherein, assumption signalings of the K ePDCCH detection sets can be uniformly or independently configured, and K is a positive integer.

The terminal obtains the configured K ePDCCH detection sets by receiving the terminal dedicated higher layer signaling, and receives a higher layer signaling used for independently configuring the terminal to assume about whether another one or more DMRS antenna ports are used for ePDCCH and/or PDSCH transmissions of another one or more users in the K ePDCCH detection sets when the ePDCCH resources are detected. Wherein, assumption signalings of the K ePDCCH detection sets can be uniformly received or be independently detected and received.

Sub-Example 2 of Example 17

By configuring K ePDCCH detection sets, a base station configures a terminal to assume about whether another one or more DMRS antenna ports are used for ePDCCH and/or PDSCH transmissions of another one or more users in part or all of the K ePDCCH detection sets, wherein, K is a positive integer.

The terminal obtains the configured K ePDCCH detection sets by receiving the terminal dedicated higher layer signaling, and obtains a higher layer signaling used for configuring the terminal to assume about whether another one or more DMRS antenna ports are used for ePDCCH and/or PDSCH transmissions of another one or more users in part or all of the K ePDCCH detection sets when the ePDCCH resources are detected.

Sub-Example 3 of Example 17

By configuring X subframe sets, a base station configures a terminal to assume about whether another one or more DMRS antenna ports are used for ePDCCH and/or PDSCH transmissions of another one or more users in part or all of sets in the X subframe sets.

The terminal obtains the configured X (X is a positive integer) subframe sets by receiving the terminal dedicated higher layer signaling, and obtains a higher layer signaling used for configuring the terminal to assume about whether another one or more DMRS antenna ports are used for ePDCCH and/or PDSCH transmissions of another one or more users in part or all of the X (X>0) subframe sets when the ePDCCH resources are detected.

Correspondingly, the example of the present document also provides a base station, and the base station comprises:

a configuration module, configured to: configure an assumption about whether another one or more DMRS antenna ports are used for ePDCCH and/or PDSCH transmissions of another one or more users when ePDCCH resources are detected for a terminal; and a sending module, configured to: send the assumption to the terminal through a terminal dedicated higher layer signaling and/or a physical layer signaling.

Wherein, the configuration module is configured to: by configuring K ePDCCH detection sets, independently configure the terminal to assume about whether another one or more DMRS antenna ports are used for ePDCCH and/or PDSCH transmissions of another one user in the K ePDCCH detection sets, wherein K is a positive integer. The K ePDCCH detection sets are uniformly or independently configured by the configuration module.

Similarly, the configuration module is configured to: by configuring K ePDCCH detection sets, configure the terminal to assume about whether another one or more DMRS antenna ports are used for ePDCCH and/or PDSCH transmissions of another one or more users in part or all of the K ePDCCH detection sets, wherein K is a positive integer; or, by configuring X subframe sets, configure the terminal to assume about whether another one or more DMRS antenna ports are used for ePDCCH and/or PDSCH transmissions of another one or more users in part or all of the X subframe sets, wherein X is a positive integer.

Alternatively, the another one or more DMRS antenna ports refer to one or more DMRS antenna ports except DMRS antenna ports used for ePDCCH transmission of a specified terminal; and the DMRS antenna ports used for the ePDCCH transmission of the specified terminal include: ports 107, 108, 109 and 110.

In addition, the example of the present document also provides a terminal, and the terminal comprises:

a receiving module, configured to: receive a terminal dedicated higher layer signaling and/or a physical layer signaling sent by a base station; and an obtaining module, configured to: obtain an assumption about whether another one or more DMRS antenna ports are used for ePDCCH and/or PDSCH transmissions of another one or more users when ePDCCH resources are detected according to the terminal dedicated higher layer signaling and/or the physical layer signaling.

Wherein, the obtaining module is configured to: obtain the configured K ePDCCH detection sets according to the terminal dedicated higher layer signaling, and receive a higher layer signaling used for independently configuring the terminal to assume about whether another one or more DMRS antenna ports are used for ePDCCH and/or PDSCH transmissions of another one or more users in the K ePDCCH detection sets when the ePDCCH resources are detected, wherein K is a positive integer. The K ePDCCH detection sets are uniformly or independently obtained by the obtaining module.

Similarly, the obtaining module is configured to: obtain the configured K ePDCCH detection sets according to the terminal dedicated higher layer signaling, and obtain a higher layer signaling used for configuring the terminal to assume about whether another one or more DMRS antenna ports are used for ePDCCH and/or PDSCH transmissions of another one or more users in part or all of the K ePDCCH detection sets when the ePDCCH resources are detected, wherein K is a positive integer; or, obtain the configured X subframe sets according to the terminal dedicated higher layer signaling, and obtain a higher layer signaling used for configuring the terminal to assume about whether another one or more DMRS antenna ports are used for ePDCCH and/or PDSCH transmissions of another one or more users in part or all of the X subframe sets when the ePDCCH resources are detected, wherein K is a positive integer.

Alternatively, the another one or more DMRS antenna ports refer to one or more DMRS antenna ports except DMRS antenna ports used for ePDCCH transmission of a specified terminal; and the DMRS antenna ports used for the ePDCCH transmission of the specified terminal include: ports 107, 108, 109 and 110.

The example of the present document also provides a method for obtaining antenna port information, and the method comprises:

a terminal determining whether it is required to assume about whether another one or more DMRS antenna ports are used for ePDCCH or PDSCH transmissions of another one or more terminals when ePDCCH resources are detected according to an ePDCCH transmission mode.

Wherein, the step of a terminal determining whether it is required to assume about whether another one or more DMRS antenna ports are used for ePDCCH or PDSCH transmissions of another one or more terminals when ePDCCH resources are detected according to an ePDCCH transmission mode includes:

when the terminal is configured as a centralized ePDCCH, the terminal always assuming that another one or more DMRS antenna ports are not used for ePDCCH or PDSCH transmissions of another one or more terminals when the ePDCCH resources are detected; or when the terminal is configured as a distributed ePDCCH, the terminal always assuming that another one or more DMRS antenna ports are used for ePDCCH or PDSCH transmissions of another one or more terminals when the ePDCCH resources are detected.

Wherein, the another one or more DMRS antenna ports refer to one or more DMRS antenna ports except DMRS antenna ports used for ePDCCH transmission of a specified terminal; and the DMRS antenna ports used for the ePDCCH transmission of the specified terminal include: ports 107, 108, 109 and 110.

Correspondingly, the example of the present document also provides a terminal, and the terminal comprises:

a determination module, configured to: determine whether it is required to assume about whether another one or more DMRS antenna ports are used for ePDCCH or PDSCH transmissions of another one or more terminals when ePDCCH resources are detected according to an ePDCCH transmission mode.

Wherein, the determination module is configured to:

when the terminal is configured as a centralized ePDCCH, always assume that another one or more DMRS antenna ports are not used for ePDCCH or PDSCH transmissions of another one or more terminals when the ePDCCH resources are detected; or when the terminal is configured as a distributed ePDCCH, always assume that another one or more DMRS antenna ports are used for ePDCCH or PDSCH transmissions of another one or more terminals when the ePDCCH resources are detected.

Wherein, the another one or more DMRS antenna ports refer to one or more DMRS antenna ports except DMRS antenna ports used for ePDCCH transmission of a specified terminal; and the DMRS antenna ports used for the ePDCCH transmission of the specified terminal include: ports 107, 108, 109 and 110.

In addition, the example of the present document also provides a method for obtaining antenna port information, and the method comprises:

a terminal always assuming that another one or more DMRS antenna ports are not used for ePDCCH or PDSCH transmissions of another one or more terminals when ePDCCH resources are detected.

Example 18

A terminal always assumes that another one or more DMRS antenna ports are not used for ePDCCH and/or PDSCH transmissions of another one or more users when ePDCCH resources are detected.

Wherein, the another one or more DMRS antenna ports refer to one or more DMRS antenna ports except DMRS antenna ports used for ePDCCH transmission of a specified terminal; and the DMRS antenna ports used for the ePDCCH transmission of the specified terminal include: ports 107, 108, 109 and 110.

Example 19

A terminal always assumes that all the other DMRS antenna ports except DMRS antenna ports used for ePDCCH transmission of a specified terminal are not used for ePDCCH and/or PDSCH transmissions of another one or more users when ePDCCH resources are detected.

Wherein, the DMRS antenna ports used for the ePDCCH transmission of the specified terminal include: ports 107, 108, 109 and 110.

Correspondingly, the example of the present document also provides a terminal, and the terminal comprises: a processing module, configured to: when ePDCCH resources are detected, always assume that another one or more DMRS antenna ports are not used for ePDCCH or PDSCH transmissions of another one or more terminals.

Wherein, the another one or more DMRS antenna ports refer to one or more DMRS antenna ports except DMRS antenna ports used for ePDCCH transmission of a specified terminal; and the DMRS antenna ports used for the ePDCCH transmission of the specified terminal include: ports 107, 108, 109 and 110.

It is should be noted that, in the above examples of the present document, a main purpose of assuming about whether another one or more DMRS ports are used for ePDCCH or PDSCH transmissions of other users is: when the ePDCCH is detected, whether the terminal is required to consider detecting other ports based on DMRS antenna ports of the terminal for obtaining the interference of other ports with the ePDCCH of the terminal. If it is assumed that another one or more DMRS ports are not used for ePDCCH or PDSCH transmissions of other users, the terminal cannot detect other ports for obtaining interference information, and if it is assumed that another one or more DMRS ports are used for ePDCCH or PDSCH transmissions of other users, the terminal can select to detect other ports for obtaining interference information.

In the above examples, an ePDCCH detection error caused by the terminal mistakenly detecting interference information of other ports can be avoided.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or more integrated circuits. Correspondingly, each module/unit in the above examples can be implemented in a form of hardware, and also can be implemented in a form of software function module. The examples of the present document are not limited to any combination of hardware and software in a specific form.

The above examples are only used to describe the technical scheme of the examples of the present document, which does not limit the technical scheme of the present document. The present document is just described in detail with reference to the preferred examples. The ordinary person skilled in the art should understand that, with regard to the technical scheme of the examples of the present document, modifications or equivalent substitutions can be made without departing from the spirit and scope of the technical scheme of the present document, and all these modifications and equivalent substitutions should be covered within the scope of the claims of the present document.

INDUSTRIAL APPLICABILITY

In the example of the present document, more flexible scheduling configurations can be implemented, which enhances a self-adaptive capability and average performance of the system, improves an accuracy rate of the system detection, and avoids a problem of ePDCCH detection error caused by the terminal mistakenly detecting interference information of other ports.

What is claimed is:

1. A method for configuring Channel State Information (CSI) feedback signalings, comprising:
   a base station configuring N CSI measurement processes used for measuring and feeding back CSI for a terminal, wherein, each of the N CSI measurement processes is independently configured with one or more of the following signalings through a terminal dedicated higher layer signaling: a codebook subset restriction (codebookSubsetRestriction), RI feedback enabled according to reference process, PMI feedback enabled according to reference process, sub-band feedback enabled according to reference process, and an initialization sequence Identifier (ID) of PUCCH corresponding to CSI measurement process; and
   the base station sending the N CSI measurement processes to the terminal, wherein N is a positive integer,
   wherein, each CSI measurement process in the N CSI measurement processes only includes one CSI process, or includes a combination of one CSI process and one subframe set; wherein,
   when one CSI process is configured with subframe set information, the CSI process is divided into two CSI measurement processes, a first CSI measurement process corresponds to a combination of the CSI process and a first subframe set in the subframe set information, and a second CSI measurement process corresponds to a combination of the CSI process and a second subframe set in the subframe set information.

2. The method according to claim 1, wherein:
   after the step of a base station configuring N CSI measurement processes for a terminal, the method further comprises:
   the base station configuring one or more CSI processes corresponding to an aperiodic triggering state through a terminal dedicated higher layer signaling using a bitmap sequence; and
   the base station triggering one or more CSI processes corresponding to each aperiodic triggering state through a 2-bit trigger signaling in Downlink Control Information (DCI),
   wherein, the CSI measurement process only includes one CSI process, or includes a combination of one CSI process and one subframe set.

3. A method for feeding back Channel State Information (CSI), comprising:
   a terminal receiving N CSI measurement processes sent by a base station, wherein, each of the N CSI measurement processes is independently configured with one or more of the following signalings through a terminal dedicated higher layer signaling: a codebook subset restriction, RI feedback enabled according to reference process, PMI feedback enabled according to reference process, sub-band feedback enabled according to reference process, and an initialization sequence Identifier (ID) of PUCCH corresponding to CSI measurement process; and
   the terminal measuring CSI according to the N CSI measurement processes, and feeding back a measurement report to the base station,
   wherein N is a positive integer,
   wherein, the measurement report includes one or more of the following contents: PMI, Channel Quality Information (CQI) and RI,
   wherein, each CSI measurement process in the N CSI measurement processes only includes one CSI process, or includes a combination of one CSI process and one subframe set; wherein:
   when one CSI process is configured with subframe set information, the CSI process is divided into two CSI measurement processes, a first CSI measurement process corresponds to a combination of the CSI process and a first subframe set in the subframe set information, and a second CSI measurement process corresponds to a combination of the CSI process and a second subframe set in the subframe set information.

4. The method according to claim 3, further comprising:
   when a collision occurs among a plurality of measurement reports fed back by the terminal, the terminal dropping measurement reports in turn according to a priority order of report type, CSI measurement process index and carrier index.

5. The method according to claim 3, wherein:
   after the step of a terminal receiving N CSI measurement processes sent by a base station, the method further comprises:
   the terminal obtaining one or more CSI processes corresponding to one aperiodic triggering state by receiving a terminal dedicated higher layer signaling using a bitmap sequence; and
   the terminal obtaining a signaling for triggering one or more CSI processes corresponding to each aperiodic triggering state by detecting a 2-bit trigger signaling in Downlink Control Information (DCI).

6. A base station, comprising hardware performing instructions stored in a non-transitory computer readable medium which executes steps in following modules:
   a configuration module, configured to: configure N Channel State Information (CSI) measurement processes used for measuring and feeding back CSI for a terminal, wherein, each of the N CSI measurement processes is independently configured with one or more of the following signalings through a terminal dedicated higher layer signaling: a codebook subset restriction (code bookSubsetRestriction), RI feedback enabled according to reference process, PMI feedback enabled according to reference process, sub-band feedback enabled according to reference process, and an initialization sequence Identifier (ID) of PUCCH corresponding to CSI measurement process; and
   a sending module, configured to: send the N CSI measurement processes to the terminal, wherein N is a positive integer,
   wherein, each CSI measurement process in the N CSI measurement processes only includes one CSI process, or includes a combination of one CSI process and one subframe set; wherein:
   when one CSI process is configured with subframe set information, the CSI process is divided into two CSI measurement processes, a first CSI measurement process corresponds to a combination of the CSI process and a first subframe set in the subframe set information, and a second CSI measurement process corresponds to a combination of the CSI process and a second subframe set in the subframe set information.

7. The base station according to claim 6, wherein:
   the configuration module is further configured to: configure one or more CSI processes corresponding to an aperiodic triggering state through a terminal dedicated higher layer signaling using a bitmap sequence; and trigger one or more CSI processes corresponding to each aperiodic triggering state through a 2-bit trigger signaling in Downlink Control Information (DCI).

8. A terminal, comprising hardware performing instructions stored in a non-transitory computer readable medium which executes steps in following modules:
a receiving module, configured to: receive N Channel State Information (CSI) measurement processes sent by a base station, wherein, each of the N CSI measurement processes is independently configured with one or more of the following signalings through a terminal dedicated higher layer signaling: a codebook subset restriction, RI feedback enabled according to reference process, PMI feedback enabled according to reference process, sub-band feedback enabled according to reference process, and an initialization sequence Identifier (ID) of PUCCH corresponding to CSI measurement process; and
a feedback module, configured to: measure CSI according to the N CSI measurement processes, and feed back a measurement report to the base station,
wherein N is a positive integer,
wherein, each CSI measurement process in the N CSI measurement processes only includes one CSI process, or includes a combination of one CSI process and one subframe set,
wherein, the measurement report includes one or more of the following contents: PMI, Channel Quality Information (CQI) and RI; wherein:
when one CSI process is configured with subframe set information, the CSI process is divided into two CSI measurement processes, a first CSI measurement process corresponds to a combination of the CSI process and a first subframe set in the subframe set information, and a second CSI measurement process corresponds to a combination of the CSI process and a second subframe set in the subframe set information.

9. The terminal according to claim 8, wherein:
the feedback module is configured to feed back the measurement report to the base station by means of:
when determining that a collision occurs among a plurality of measurement reports required to be fed back, dropping measurement reports in turn according to a priority order of report type, CSI measurement process index and carrier index, and feeding back measurement reports that are not dropped.

10. The terminal according to claim 8, wherein:
the receiving module is further configured to: obtain one or more CSI processes corresponding to one aperiodic triggering state by receiving a terminal dedicated higher layer signaling using a bitmap sequence; and obtain a signaling for triggering one or more CSI processes corresponding to each aperiodic triggering state by detecting a 2-bit trigger signaling in Downlink Control Information (DCI).

11. A method for configuring data demodulation, comprising:
a base station configuring a corresponding relationship between N Channel State Information (CSI) measurement processes and demodulation pilot frequencies for a terminal, wherein, the corresponding relationship is used for indicating the terminal to use large-scale information and/or interference information corresponding to which CSI measurement process to perform pilot frequency demodulation and data detection on a subframe on which downlink services are currently received; wherein the large-scale information includes one or more of the following information: delay spread, each path delay, doppler frequency shift, doppler spread and average receiving power; and
the base station sending the corresponding relationship to the terminal,
wherein, each CSI measurement process in the N CSI measurement processes only includes one CSI process, or includes a combination of one CSI process and one subframe set,
wherein, when one CSI process is configured with subframe set information, the CSI process is divided into two CSI measurement processes, a first CSI measurement process corresponds to a combination of the CSI process and a first subframe set in the subframe set information, and a second CSI measurement process corresponds to a combination of the CSI process and a second subframe set in the subframe set information,
wherein each of the N CSI measurement processes is independently configured with one or more of signalings through a terminal dedicated higher layer signaling, and N is a positive integer.

12. A method for data demodulation, comprising:
a terminal receiving a corresponding relationship between N Channel State Information (CSI) measurement processes and demodulation pilot frequencies sent by a base station; and
the terminal determining to use large-scale information and/or interference information corresponding to which CSI measurement process to perform pilot frequency demodulation and data detection on a subframe on which downlink services are currently received according to the corresponding relationship, wherein, the large-scale information includes one or more of the following information: delay spread, each path delay, doppler frequency shift, doppler spread and average receiving power,
wherein, each CSI measurement process in the N CSI measurement processes only includes one CSI process, or includes a combination of one CSI process and one subframe set,
wherein, when one CSI process is configured with subframe set information, the CSI process is divided into two CSI measurement processes, a first CSI measurement process corresponds to a combination of the CSI process and a first subframe set in the subframe set information, and a second CSI measurement process corresponds to a combination of the CSI process and a second subframe set in the subframe set information,
wherein each of the N CSI measurement processes is independently configured with one or more of signalings through a terminal dedicated higher layer signaling, and N is a positive integer.

13. A base station, comprising hardware performing instructions stored in a non-transitory computer readable medium which executes steps in following modules:
a configuration module, configured to: configure a corresponding relationship between N Channel State Information (CSI) measurement processes and demodulation pilot frequencies for a terminal, wherein, the corresponding relationship is used for indicating the terminal to use large-scale information and/or interference information corresponding to which CSI measurement process to perform pilot frequency demodulation and data detection on a subframe on which downlink services are currently received; wherein the large-scale information includes one or more of the following information: delay spread, each path delay, doppler frequency shift, doppler spread and average receiving power; and a sending module, configured to: send the corresponding relationship to the terminal, wherein, each CSI measurement process in the N CSI measurement processes only includes one CSI process, or includes a combination of one CSI process and one subframe set, wherein, when one CSI process is configured with subframe set information, the CSI process is divided into two CSI measurement processes, a first CSI measurement process corresponds to a combination of the CSI process and a first subframe set in the subframe set information, and a second CSI measurement process corresponds to a combination of the CSI process and a second subframe set in the subframe set information, wherein each of the N CSI measurement processes is independently configured with one or more of signalings through a terminal dedicated higher layer signaling, and N is a positive integer.

14. A terminal, comprising hardware performing instructions stored in a non-transitory computer readable medium which executes steps in following modules:

a receiving module, configured to: receive a corresponding relationship between N Channel State Information (CSI) measurement processes and demodulation pilot frequencies sent by a base station; and a processing module, configured to: determine to use large-scale information and/or interference information corresponding to which CSI measurement process to perform pilot frequency demodulation and data detection on a subframe on which downlink services are currently received according to the corresponding relationship, wherein, the large-scale information includes one or more of the following information: delay spread, each path delay, doppler frequency shift, doppler spread and average receiving power, wherein, each CSI measurement process in the N CSI measurement processes only includes one CSI process, or includes a combination of one CSI process and one subframe set, wherein each of the N CSI measurement processes is independently configured with one or more of signalings through a terminal dedicated higher layer signaling, and N is a positive integer, wherein, when one CSI process is configured with subframe set information, the CSI process is divided into two CSI measurement processes, a first CSI measurement process corresponds to a combination of the CSI process and a first subframe set in the subframe set information, and a second CSI measurement process corresponds to a combination of the CSI process and a second subframe set in the subframe set information.

* * * * *